March 1, 1960 R. L. SWINDLER 2,926,371
EDGE TREATING APPARATUS
Filed Nov. 13, 1957 18 Sheets-Sheet 1
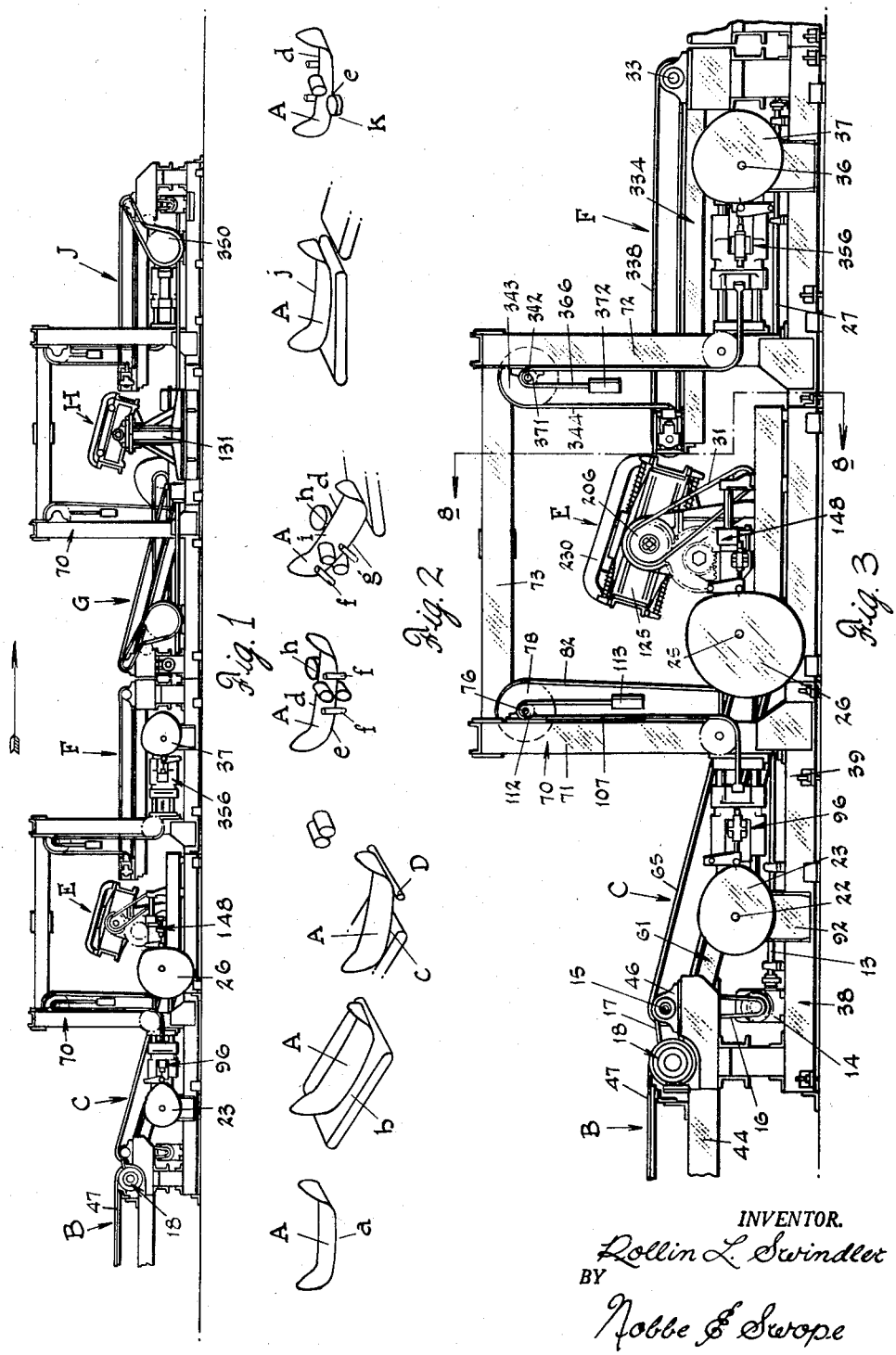
INVENTOR.
Rollin L. Swindler
BY
Nobbe & Swope
ATTORNEYS

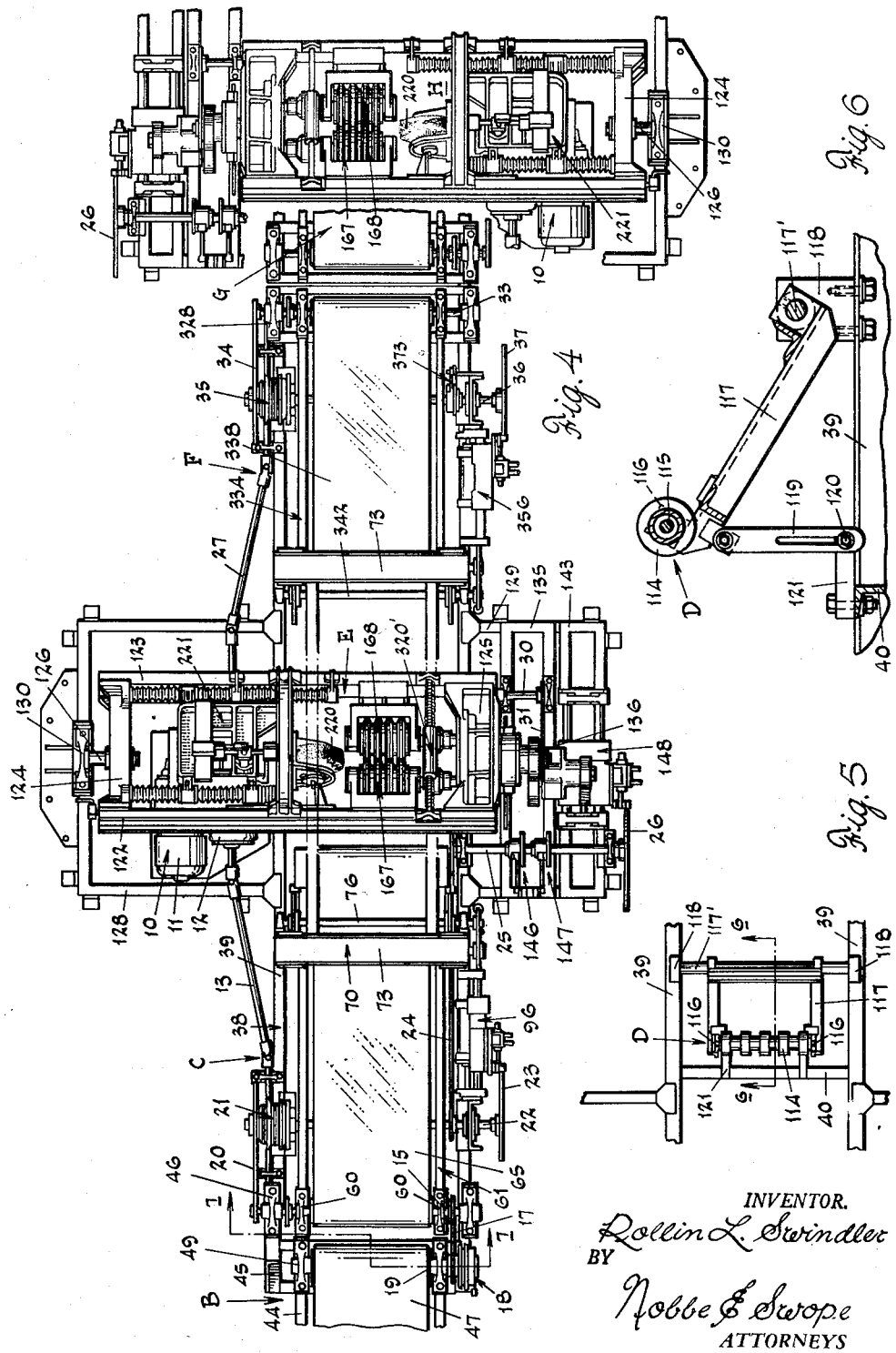

March 1, 1960 R. L. SWINDLER 2,926,371
EDGE TREATING APPARATUS
Filed Nov. 13, 1957 18 Sheets-Sheet 3

INVENTOR.
Rollin L. Swindler
BY
Nobbe & Swope
ATTORNEYS

March 1, 1960

R. L. SWINDLER 2,926,371

EDGE TREATING APPARATUS

Filed Nov. 13, 1957

INVENTOR.
Rollin L. Swindler
BY
Nobbe & Swope
ATTORNEYS

March 1, 1960 R. L. SWINDLER 2,926,371
EDGE TREATING APPARATUS
Filed Nov. 13, 1957 18 Sheets-Sheet 5

INVENTOR.
Rollin L. Swindler
BY
Nobbe & Swope
ATTORNEYS

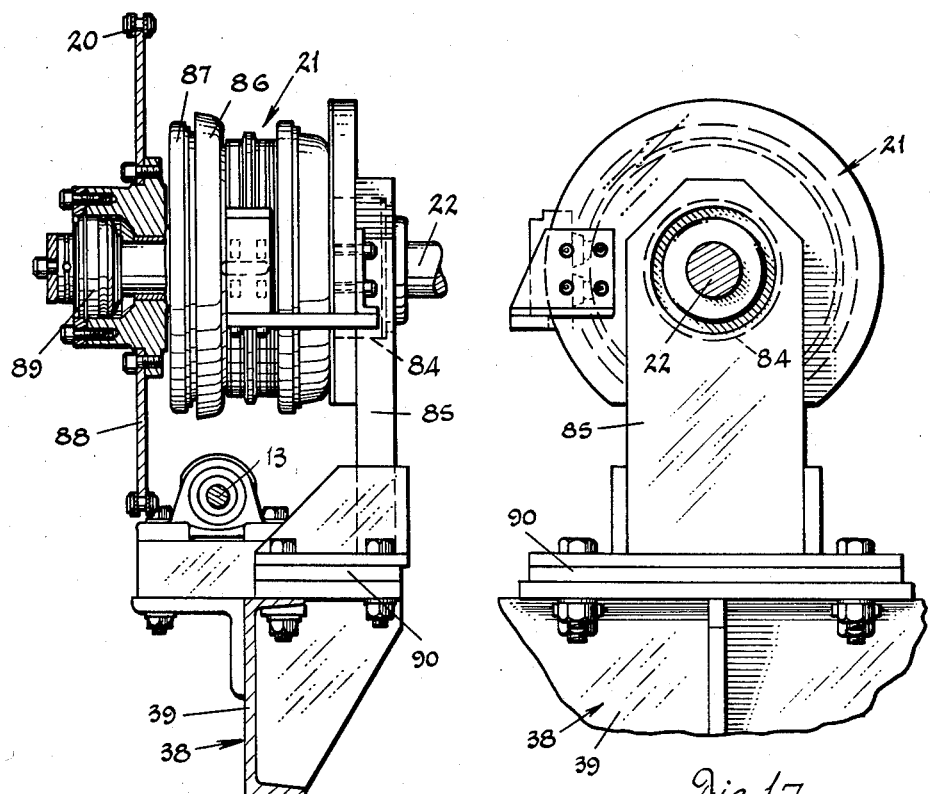
Fig. 16
Fig. 17
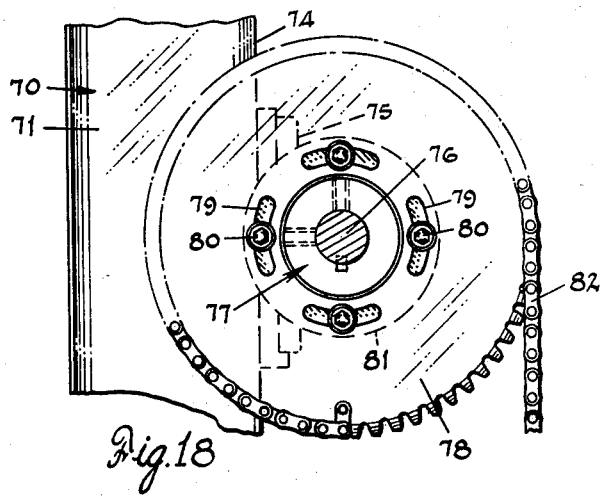
Fig. 18
INVENTOR.
Rollin L. Swindler
BY
Nobbe & Swope
ATTORNEYS

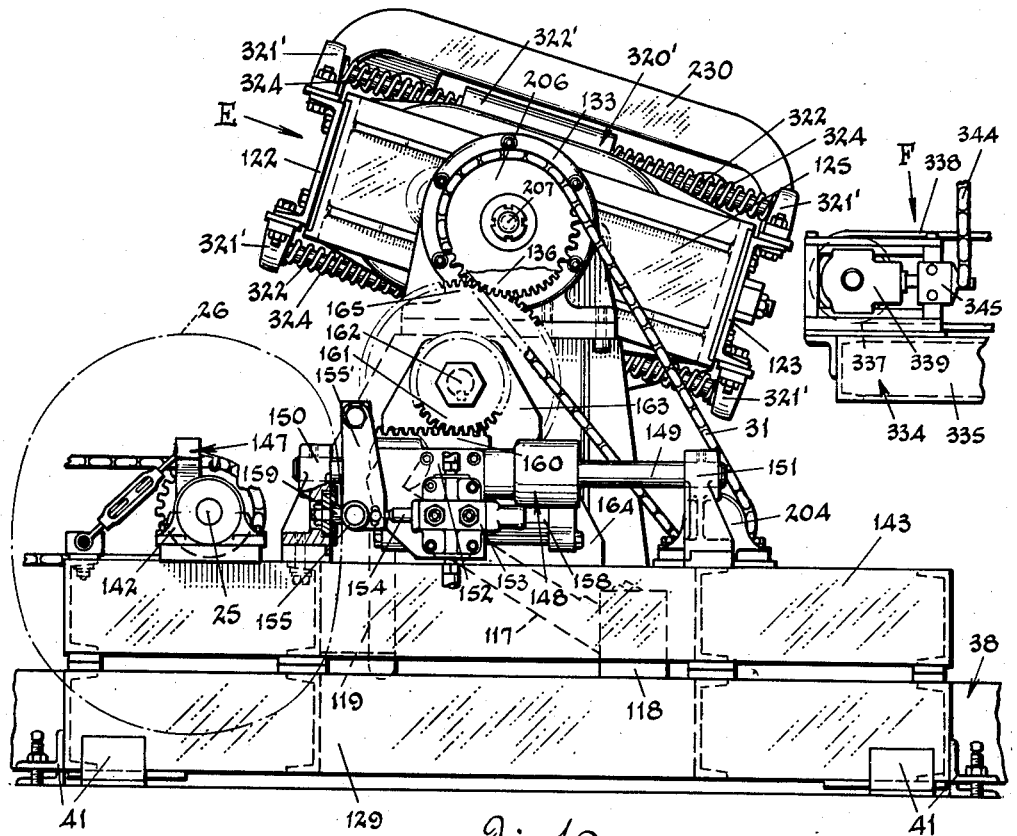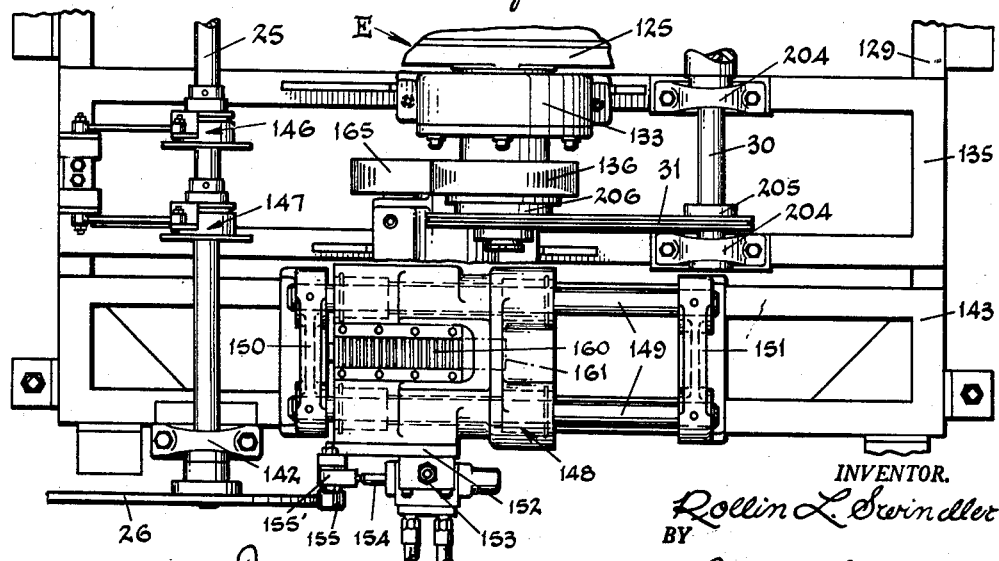

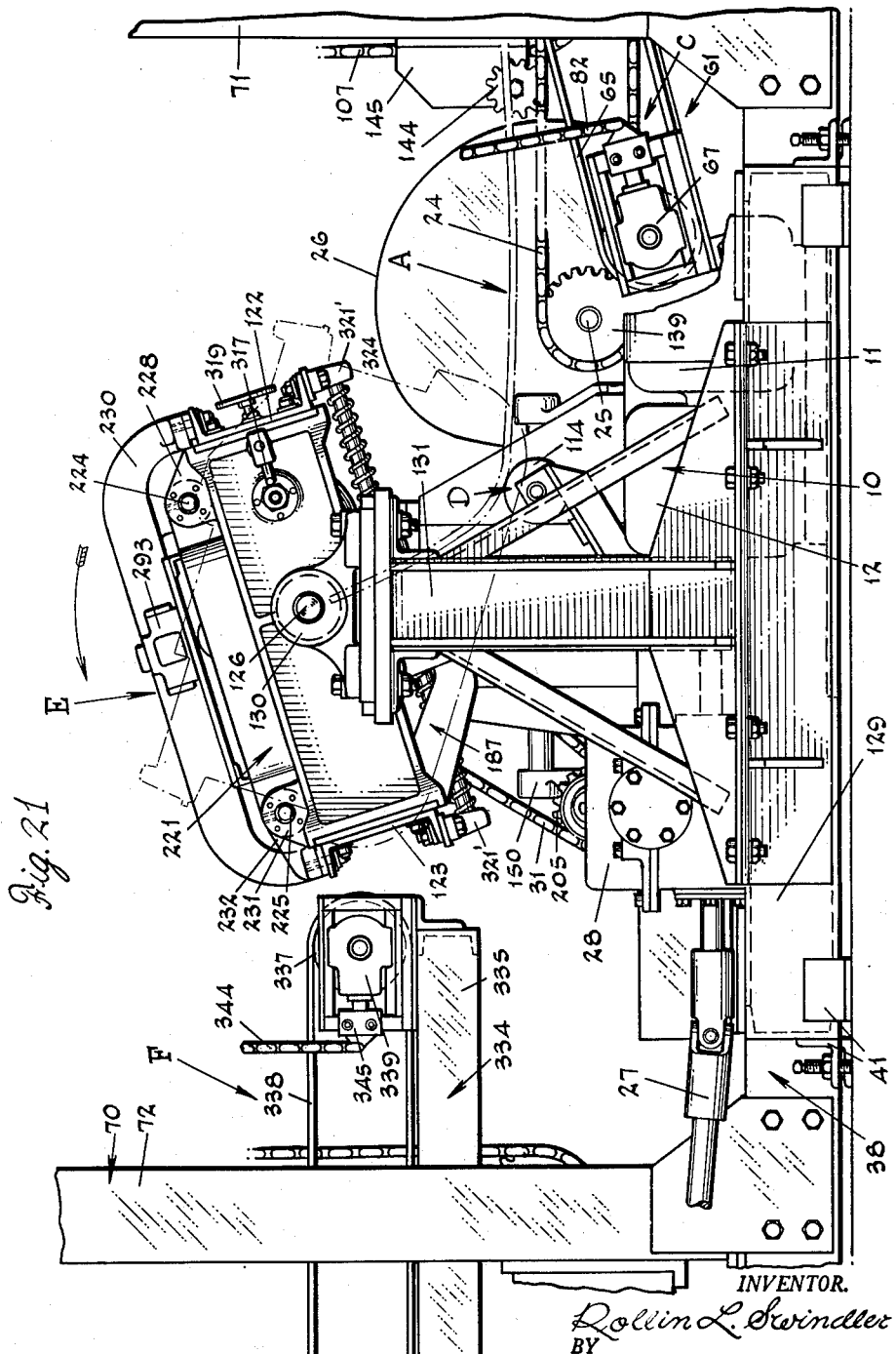

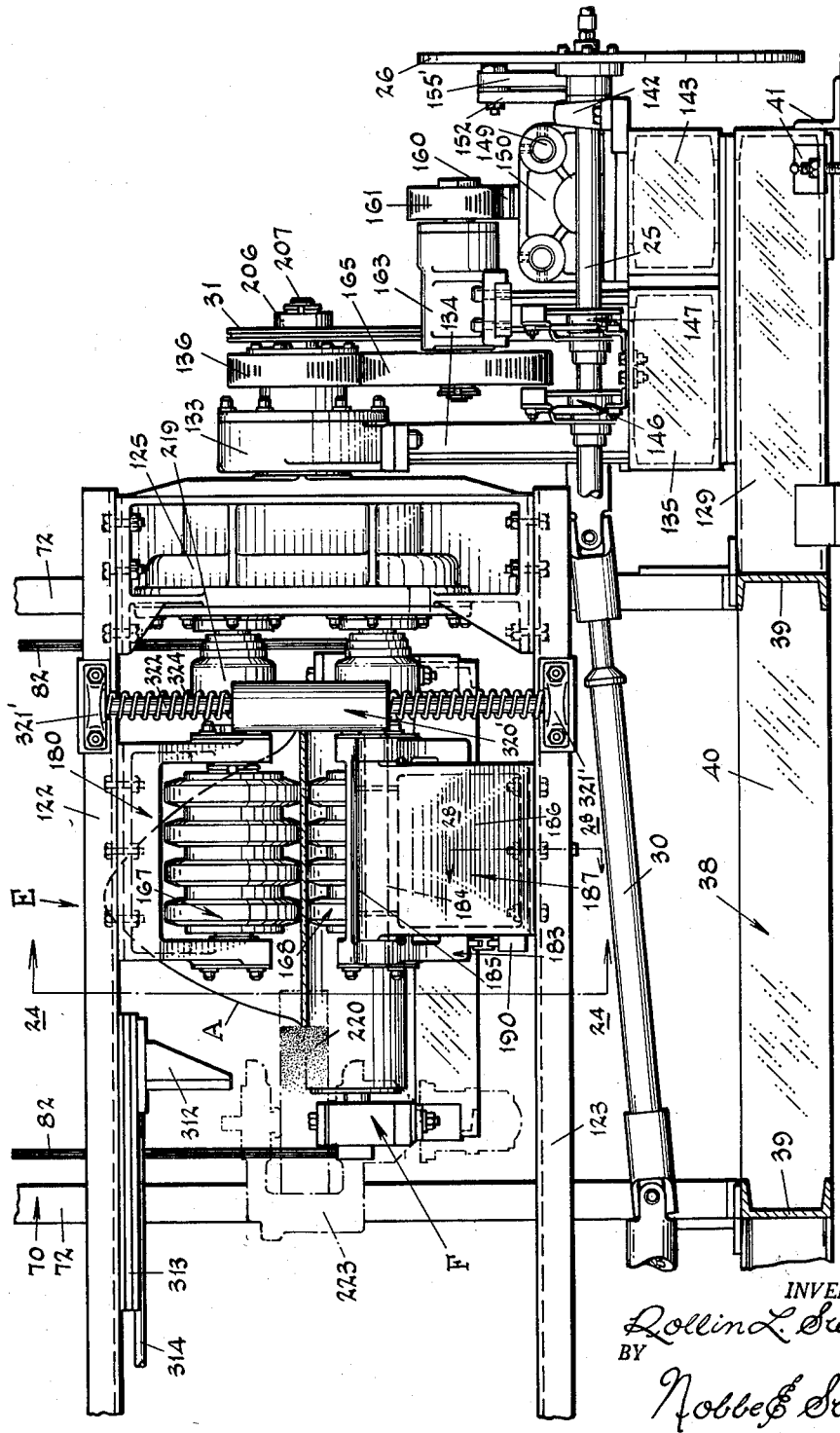

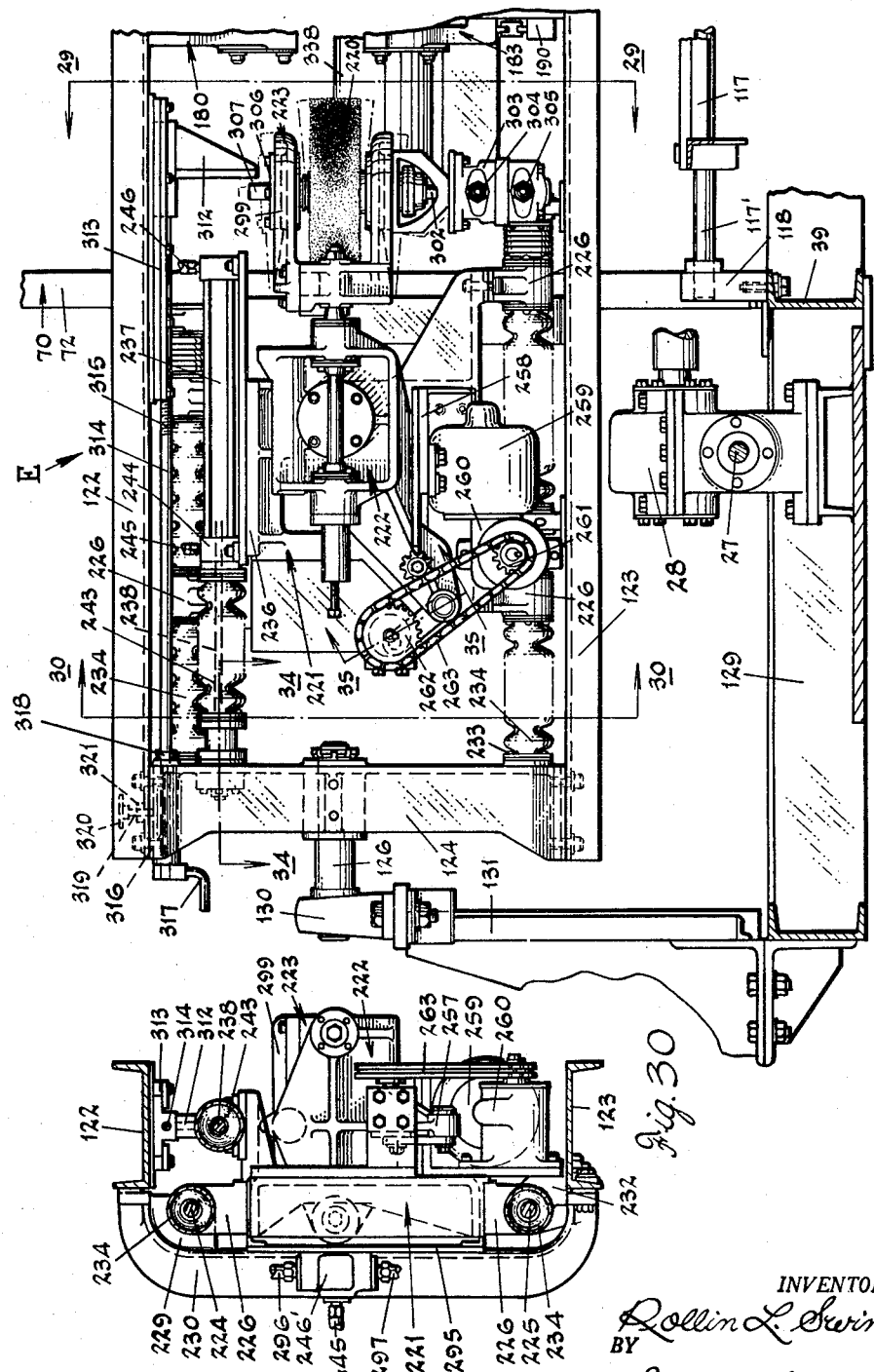

INVENTOR.
Rollin L. Swindler
BY
Nobbe & Swope
ATTORNEYS

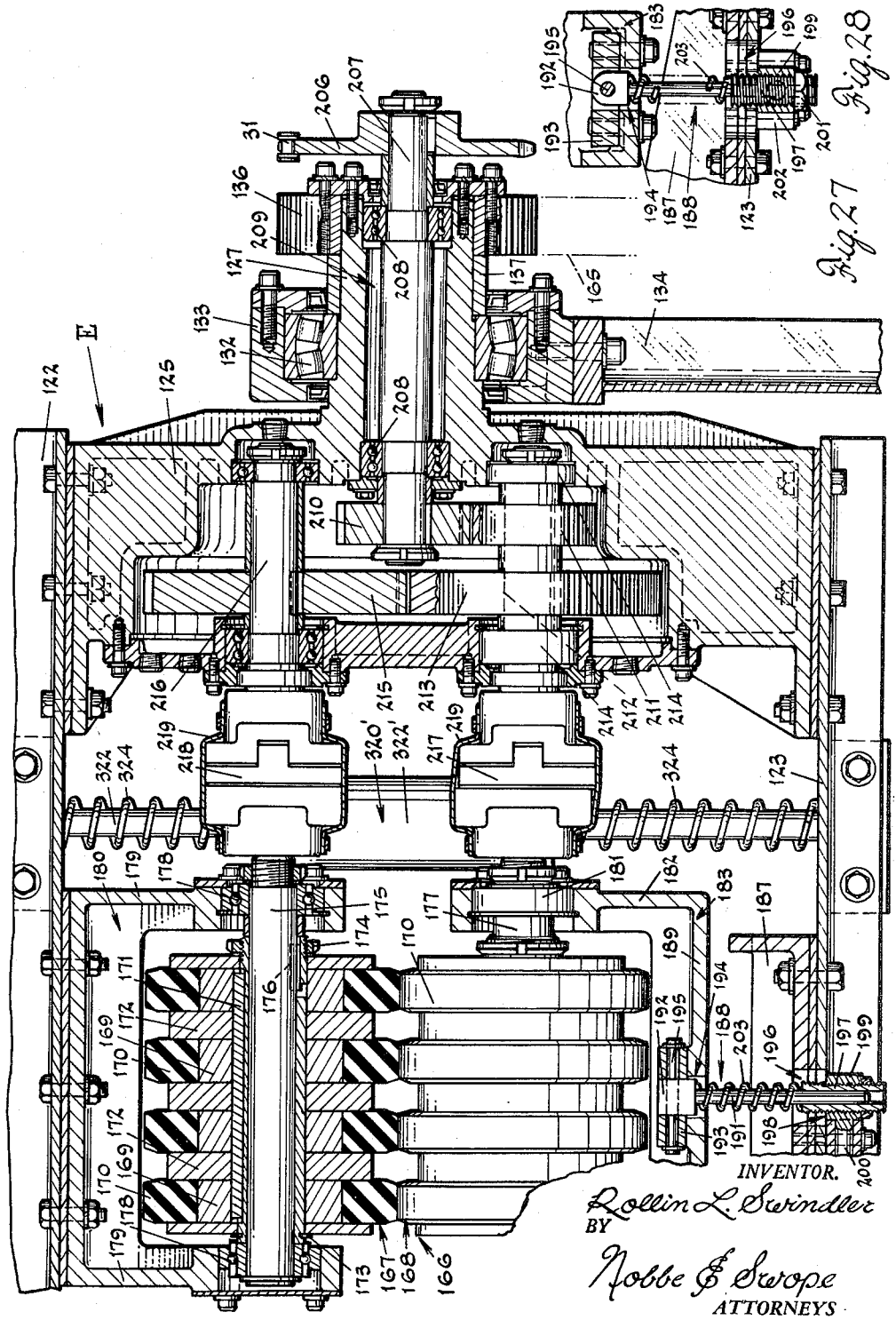

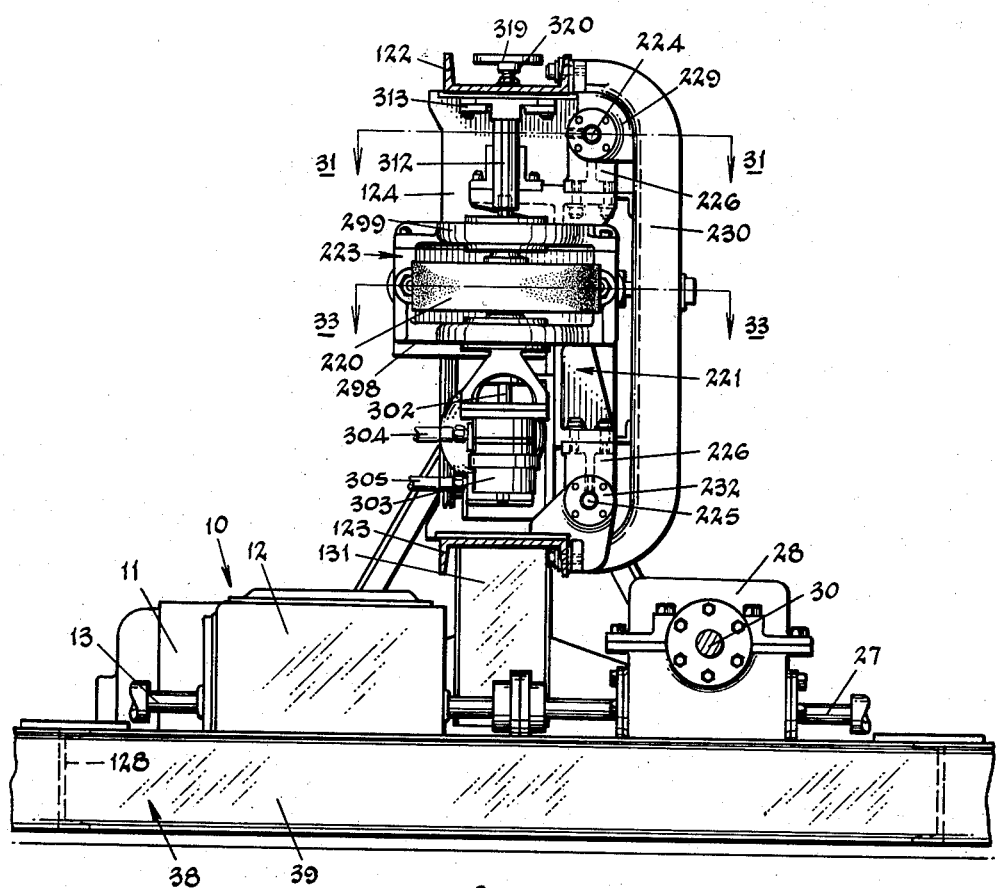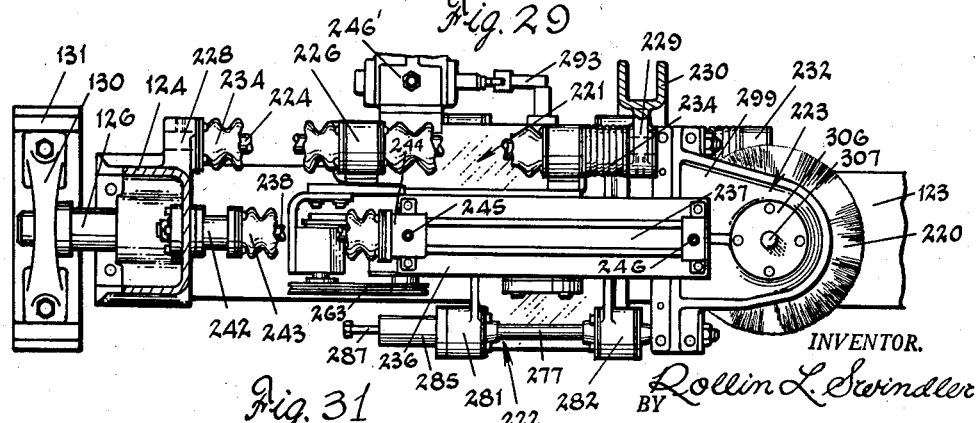

March 1, 1960
R. L. SWINDLER
2,926,371
EDGE TREATING APPARATUS
Filed Nov. 13, 1957
18 Sheets-Sheet 15
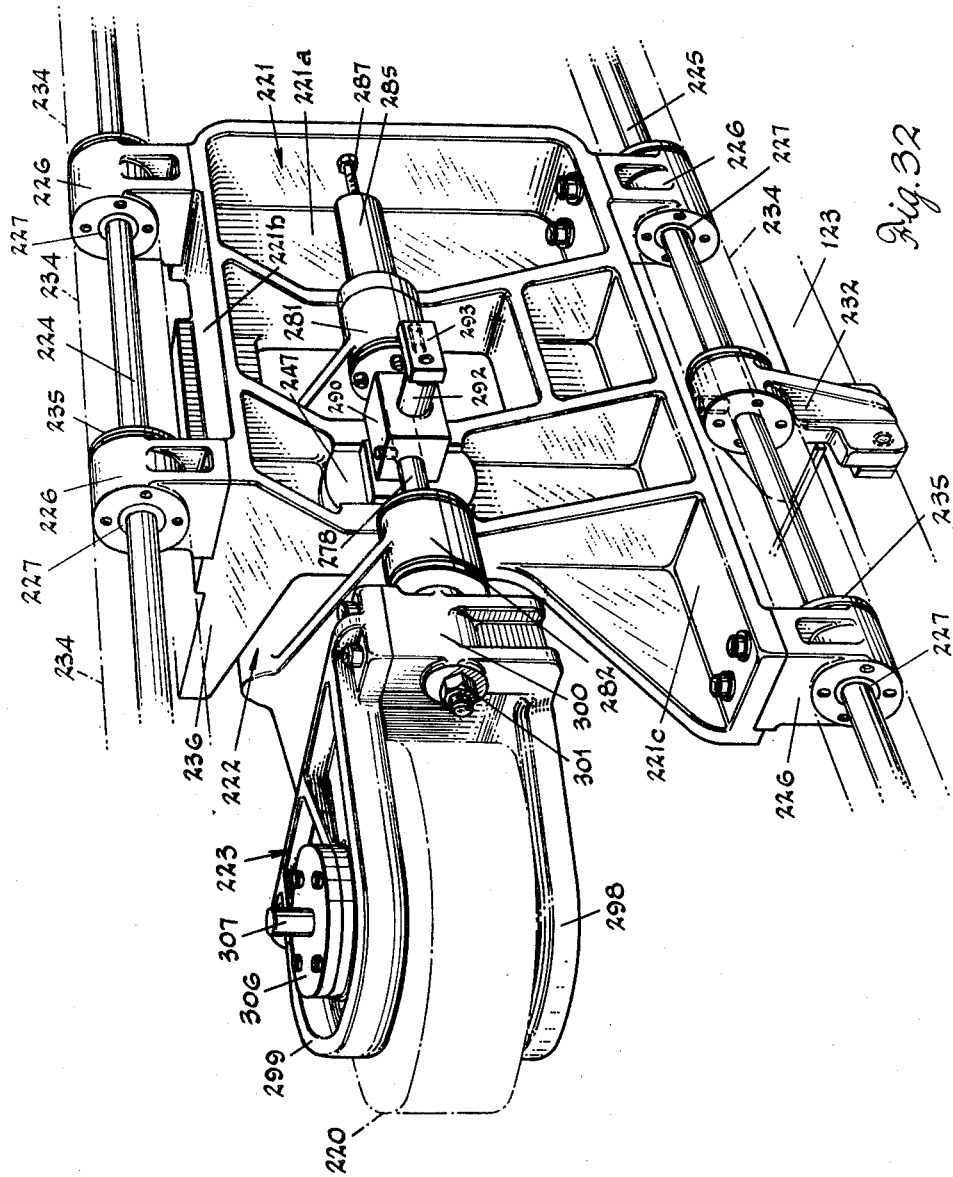
INVENTOR.
Rollin L. Swindler
BY
Nobbe & Swope
ATTORNEYS

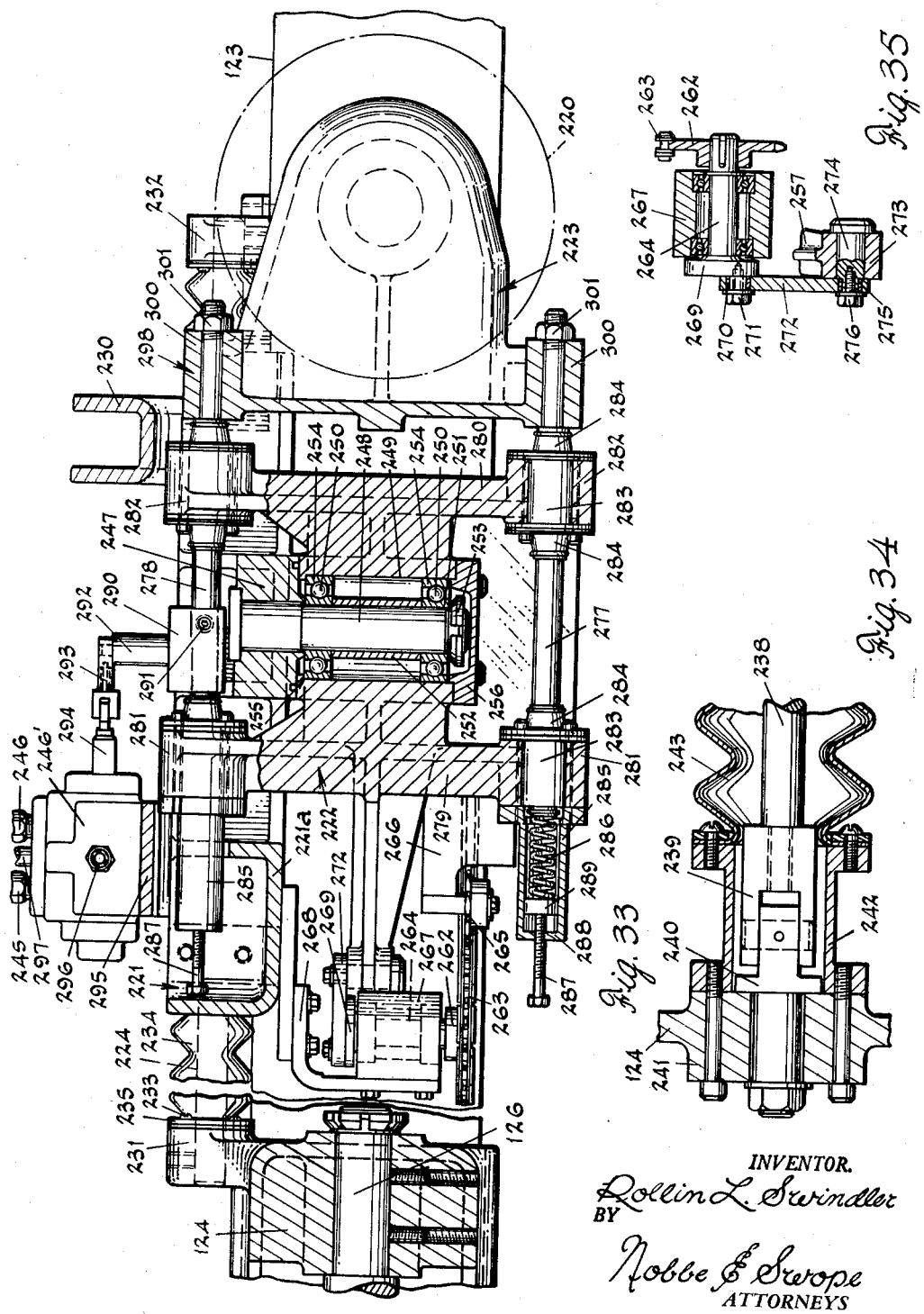

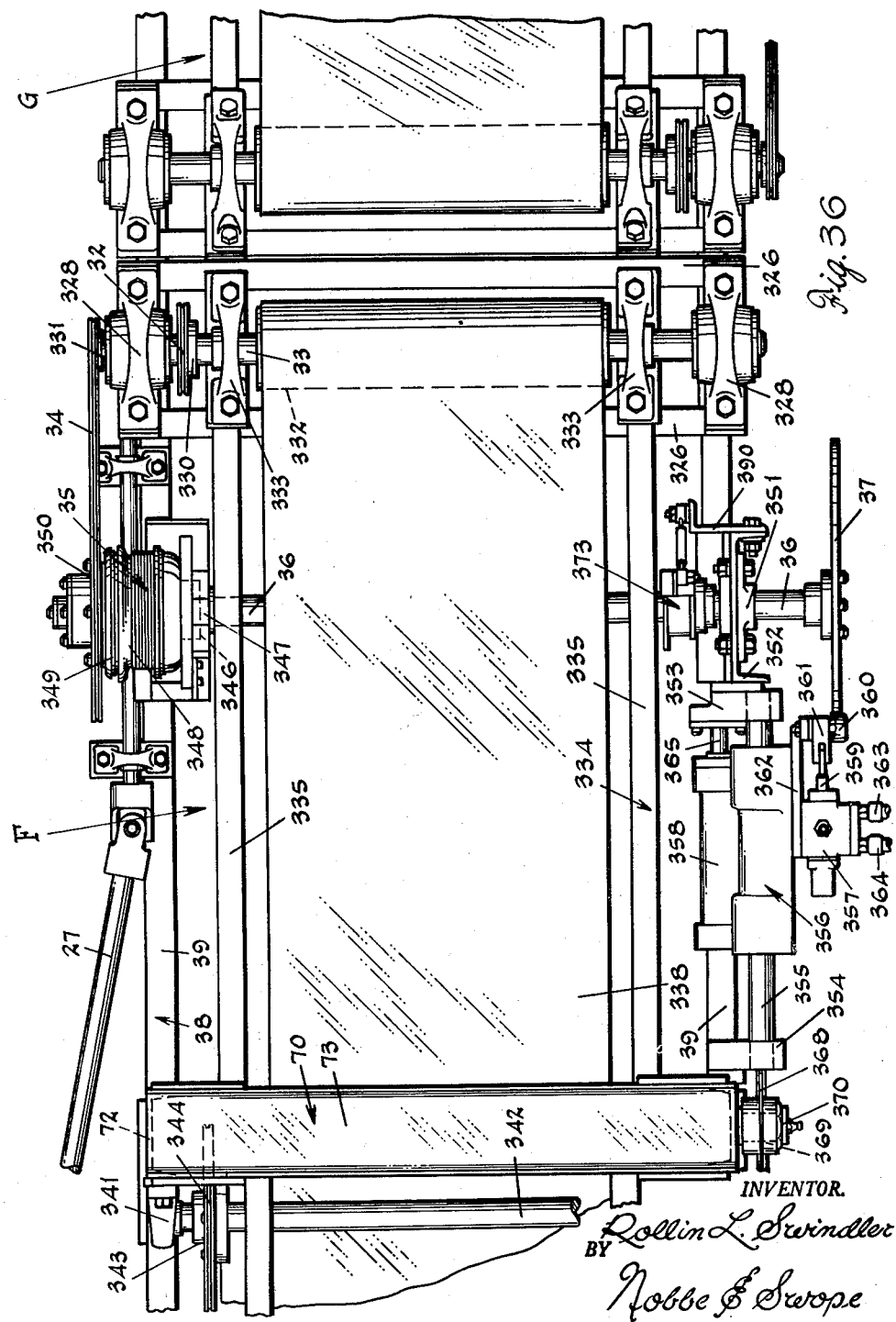

March 1, 1960 R. L. SWINDLER 2,926,371
EDGE TREATING APPARATUS
Filed Nov. 13, 1957 18 Sheets-Sheet 18
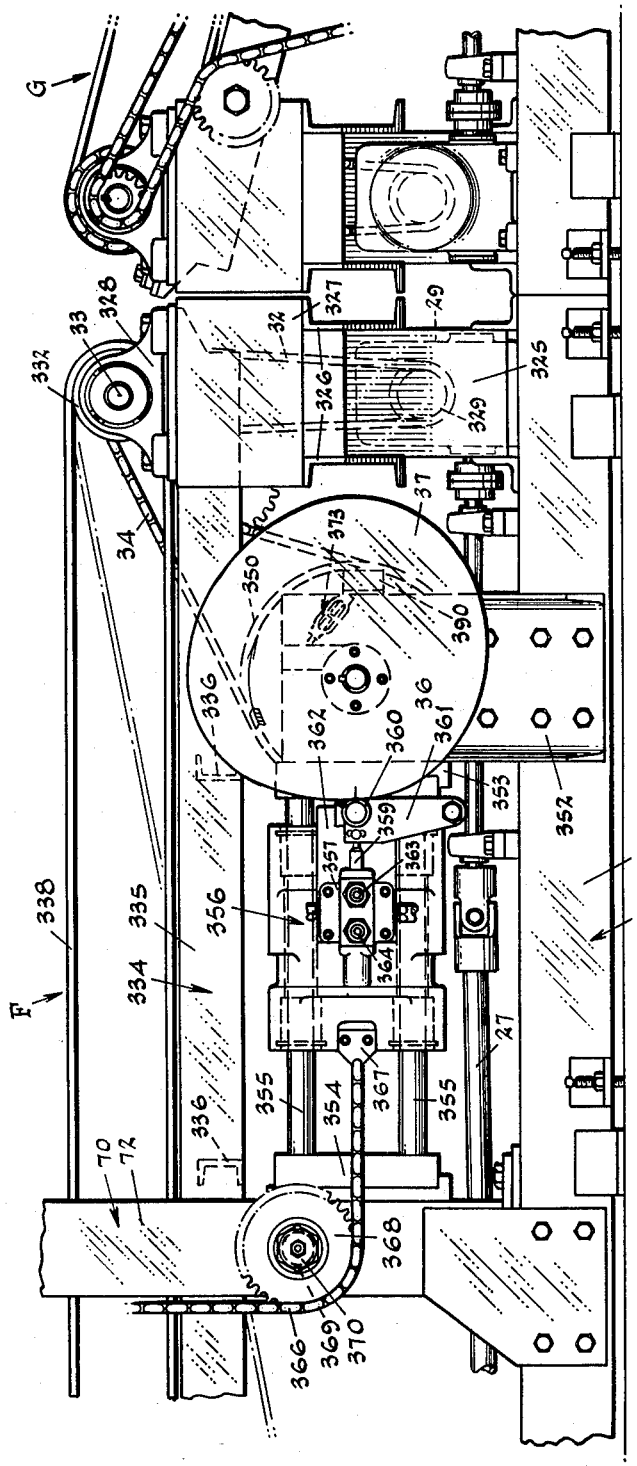
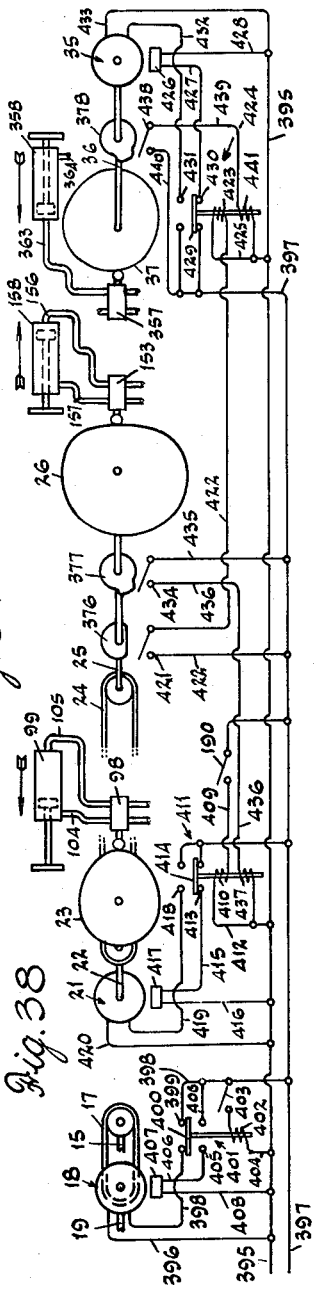
Fig. 37
Fig. 38
INVENTOR.
Rollin L. Swindler
BY
Nobbe & Swope
ATTORNEYS United States Patent Office 2,926,371
Patented Mar. 1, 1960

2,926,371

EDGE TREATING APPARATUS

Rollin L. Swindler, Ottawa, Ill., assignor to Libbey-Owens-Ford Glass Company, Toledo, Ohio, a corporation of Ohio Application November 13, 1957, Serial No. 696,268

16 Claims. (Cl. 15—77)

This invention relates broadly to the edge treating of sheet materials and, more particularly, is concerned with an improved apparatus for automatically treating the edges of bent sheets of laminated safety glass.

The apparatus of this invention will be found, although not restricted thereto, to have advantageous utility in the fabrication of laminated or so-called "safety" glass. Laminated glass is, of course, made up of two sheets or plates of glass with an interposed layer of non-brittle thermoplastic material, such as polyvinyl butyral resin, all bonded together under heat and pressure to form a composite, transparent structure. In the finishing of such structures and particularly when the glass sheets are flat, the perimeter, or edges thereof, are subsequently ground to produce smooth corner surfaces and, in most instances, remove a band of waste thermoplastic material which remains after the laminating operation. These finishing procedures are conventionally carried out on equipment that is adapted to operate sequentially on the continuous edge of the laminated safety glass structure.

However, with the introduction of bent laminated glass structures such as the windshield of the modern automobile, the size and deeply bent curvatures of the required glass sheets has rendered such equipment as heretofore satisfactorily used, entirely inadequate for edge treating and/or cleaning operations which should occur in a substantially continuous manner of production flow. A natural recourse to hand working of the windshield or like structures would of course be attended by laborious handling and an increase in the time required to process the unit through to completion. Now, by means of apparatus incorporating the embodiments of this invention, a substantially continuous flow of bent windshields or the like can be assured and the edges thereof effectively treated or cleaned to remove the objectionable band of waste material and simultaneously produce satisfactorily smoothed corners about the perimeter edge.

The principal object of the invention therefore resides in an improved apparatus for edge treating laminated materials such as of glass, said apparatus having juxtaposed traction rolls and a brushing tool and with positioning means adapted to engage one edge of a bent laminated glass sheet while the opposite edge is in engagement with said brushing tool.

Another object of the invention resides in the provision in an improved apparatus for edge treating laminated safety glass, of means for feeding a bent laminated glass sheet into engagement with a brushing tool, supporting said brushing tool for substantially horizontal reciprocal movement relative to the edge of said glass sheet while maintaining the opposite edge of the glass sheet in a substantially forwardly directed path as it is carried through the said feeding means.

Another object of the invention resides in the provision in an improved apparatus for edge treating the opposite edges of laminated safety glass in sequently occurring phases of operation, of a brushing means maintained in substantially perpendicular relation to the engaged edge while being reciprocally urged thereagainst in a substantially horizontal line of movement and oscillated in a substantially vertical line of movement.

Another object of the invention resides in the provision of an improved edge cleaning apparatus for edge treating laminated safety glass, said apparatus having entry and discharge vertically swingable conveying means, between the opposed ends of which suitable traction rolls are arranged and with a substantially fixed member between the entry conveying means and said traction rolls for causing a bent laminated glass sheet to enter between said feed rolls along a predetermined path of movement.

Another object of the invention resides in an apparatus for edge treating laminated safety glass wherein a bent laminated glass sheet is caused to move along a predetermined continuously changing path toward and away from traction rolls located therein, and wherein a substantially fixed member is adapted to be shifted to change the course of the said predetermined, continuously changing path of movement as said glass sheet approaches the traction rolls whereby the cleaning of bent glass sheets of various curvatures can be easily and rapidly effected.

Another object of the invention resides in the provision, in an edge treating apparatus of the character described, of entry and discharge vertically swingable conveying means between the opposed ends of which suitable traction rolls and a brushing means are arranged with means for guiding a laminated glass sheet from the entry conveying means to the traction rolls and in which the said traction rolls and brushing means are adapted to then swing about a common substantially horizontally disposed axis to locate the bent glass sheet passing therebetween in suitable position for subsequent deposition upon the said discharge conveying means.

Another object of the invention resides in the provision in an edge treating apparatus of the character described, of control means for governing the arcuately swinging movements of the entry and discharge conveyor means about horizontal axes in timed relation to the arcuately swinging movement of the traction rolls and brushing means about a common horizontal axis, said control means being adapted to coordinate the swinging action of the said conveyor means with said traction rolls and brushing means according to the curvature of bent glass sheets passing therethrough from the entry conveyor means to the said discharge conveyor means of the edge cleaning apparatus.

Another object of the invention resides in the provision in an edge treating apparatus of the character described, of variable control means for governing the arcuately swinging movements of the entry and discharge conveyor means about horizontal axes in timed relation to the arcuate swinging movements of the traction rolls and brushing means about a common horizontal axis, said control means being adapted to vary the swinging action of the said entry and discharge conveyor means according to different curvatures of bent glass sheet to be passed therethrough from the said entry conveying means to the said discharge conveyor means of the edge cleaning apparatus.

A further object of the invention resides in the provision in an edge treating apparatus of the character described, of vertically disposed positioning rolls for continuously engaging an edge of a bent laminated glass sheet while said glass sheet is moving forwardly between feeding rolls, said positioning rolls being adapted to carry the glass sheet in continuous engagement with a rotating brushing means and of means for supporting the said brushing means in a substantially horizontal, reciprocal path to maintain said brushing means against an edge of the said glass sheet oppositely disposed from the positioning rolls.

A still further object of the invention resides in the provision in an edge treating apparatus of the character described, of a rotating brush adapted to clean an edge of a sheet of laminated safety glass and a horizontally reciprocal supporting means for maintaining said brush against the edge with means for oscillating the said brush about a substantially vertical axis to produce engagement across substantially the entire width of the peripheral surface of the brush.

Other objects and advantages of the invention will become more apparent during the course of the following description when read in connection with the accompanying drawings.

In the drawings, wherein like numerals are employed to designate the same:

Fig. 1 is a side elevational view of an edge cleaning apparatus constructed in accordance with this invention;

Fig. 2 is a diagrammatic illustration of the operation of the apparatus;

Fig. 3 is an enlarged side elevation of one section of the apparatus;

Fig. 4 is a plan view of the edge cleaning apparatus;

Fig. 5 is a plan view of a sheet guide assembly;

Fig. 6 is a longitudinal vertical sectional view of the guide assembly as taken on line 6—6 of Fig. 5;

Fig. 8 is a transverse sectional view of the apparatus as taken on line 8—8 of Fig. 3;

Fig. 9 is a fragmentary sectional view of a support roll for laminated structure as taken on line 9—9 of Fig. 8;

Fig. 10 is a side elevational view of the entry end of the edge cleaning apparatus as seen from the right-hand side of Fig. 7;

Fig. 11 is a fragmentary plan view of the entry end of the apparatus as seen in Fig. 10;

Fig. 16 is a vertical cross-sectional view of a control device as taken on line 16—16 of Fig. 14;

Fig. 17 is an elevational view of the rear surface of the control device of Fig. 16;

Fig. 18 is an enlarged fragmentary detail view of a counterbalancing assembly as taken on line 18—18 of Fig. 7;

Fig. 19 is an end elevational view of the edge cleaning carriage of the apparatus and the support therefor;

Fig. 20 is a plan view of the control assembly for the edge cleaning carriage;

Fig. 21 is an end elevational view of the carriage as viewed at the opposite side of the apparatus from Fig. 19;

Fig. 22 is a side elevational view of the edge cleaning carriage and illustrates the sheet supporting assembly mounted in the right-hand end of the carriage as viewed from the entry end of the apparatus;

Fig. 23 is a side elevational view of the carriage and illustrates the edge cleaning structure mounted in the left-hand end of the carriage. Figs. 22 and 23 in combination show the entire carriage and the opposite side from that as viewed in Fig. 8;

Fig. 27 is an enlarged longitudinally cross-sectional view of the sheet supporting end of the carriage and as taken on line 27—27 of Fig. 24;

Fig. 28 is a cross-sectional detail view as taken on line 28—28 of Fig. 22;

Fig. 29 is a transverse vertical detail view of the carriage as taken on line 29—29 of Fig. 23;

Fig. 30 is a transverse vertical detail view of carriage as taken on line 30—30 of Fig. 23;

Fig. 31 is a longitudinal horizontal detail view as taken on line 31—31 of Fig. 29;

Fig. 32 is a perspective view of the edge cleaning structure;

Fig. 33 is an enlarged horizontal detail view of the edge cleaning structure as taken on line 33—33 of Fig. 29;

Fig. 34 is a cross-sectional detail view as taken on line 34—34 of Fig. 23;

Fig. 35 is a cross-sectional detail view as taken on line 35—35 of Fig. 23;

Fig. 36 is a plan view of the take-off structure of one sectional of the edge cleaning apparatus;

Fig. 37 is a side elevational view of the take-off structure; and

Fig. 38 is a combined electric and pneumatic systems of the edge cleaning apparatus.

Figure 7:
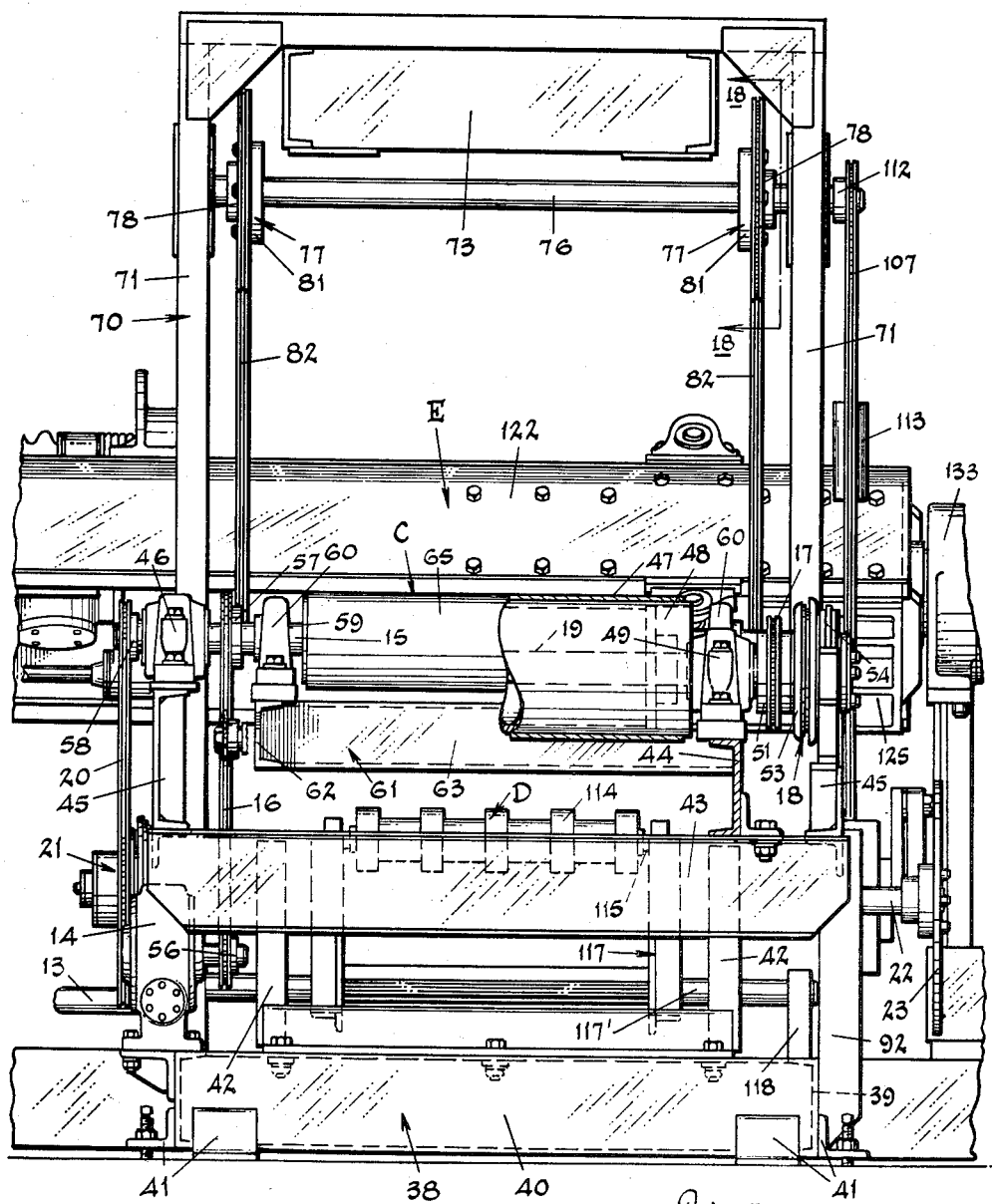
Fig. 7 is a front elevational view of the entry end of the edge cleaning apparatus as taken on line 7—7 of Fig. 4.

Briefly stated, the apparatus of this invention provides for the rapid and efficient removal of undesired material from the perimeter of an article during the finishing stages of its manufacture. As well, there is produced along the corners of the edge of the article a somewhat smoothed condition by removal of rough, minute particles of glass. While in no wise restricted to any specific use, the apparatus is employed to considerable advantage in the production of laminated glass sheets.

For this purpose, the apparatus is equipped with rotating brushes; one of which being adapted to engage one longitudinal side and then, in sequence, another brush engages the opposite side of a laminated glass sheet unit herein shown for purposes of illustration as a complexly curved or deeply-bent automobile windshield. A windshield of this character is made up of two bent and pattern-cut sheets of glass, with a layer of non-brittle plastic, such as polyvinyl butyral, interposed therebetween, which are subjected to the pressure of a heated fluid in an autoclave to unite the same into an integral unit of laminated or so-called "safety" glass. When such well-known laminating processes have been completed, the unit exhibits an unavoidable and undesired perimeter fringe of hardened and darkened plastic. Also since the corners of the edges of the laminated unit are in the same condition as they were when scored to the desired pattern and then broke out, it is found that such corners are quite sharp due to adhering rough and minutely-sized particles of glass.

By conventional methods heretofore practiced, this perimeter fringe as well as the rough edge corners have been removed and/or smoothed by grinding or hand labor which has involved repetitive shifting or repositioning of the laminated glass units along a conveyor to make the relatively long sides accessibly within the arm reach of the operators. Now, with the exception of possibly hand-working the edges of the substantially sharp wing or end areas, the laminated glass units are progressively acted upon in an uninterrupted manner, first along one side and then along the opposite side. Moreover, to conventionally handle each unit and directively guide the same into and out of the actual edge treating area, improved means is herein provided for orienting the unit along a path in which the plane of the unit is progressively varied to the end that at no time is the laminated unit sustained by support means engaged solely in one or the other of its end areas. Another purpose of this feature is to introduce the unit into the treating or cleaning area along the plane of a line that is tangent to support rolls for the unit which rolls cooperate during the brushing or cleaning action to carry the unit through the actual working area.

Diagrammatically illustrated, as in Fig. 2 of the drawings, a deeply-bent laminated glass-plastic sheet, such as indicated by the letter A, is carried to a conveyor means in the entry end of one section of the edge treating apparatus along a path located in a substantially horizontal plane as indicated at $a$. The course of the unit, in this entry area, is then diverted, as at $b$, to an angularly downwardly directed path until the unit comes into rolling contact with a rotatable guiding means. This means directs the leading end of the unit in an angularly upwardly directed path of movement, as at $c$, said path being along the plane of a line substantially tangential to the opposed peripheries of rotating rolls that are adapted to simultaneously move and support the unit while in the actual cleaning area.

When the leading end of the unit has passed between the rolls, controls are activated to initiate a corelated upward swinging of the entry conveyor means of the apparatus and a rocking motion of a carriage on which the rotating rolls and a wire brush generally are mounted. As the brush engages one side $d$ of the unit, the opopsite side $e$ moves in rolling contact with vertically disposed positioning rolls, as at $f$. While the unit continues to be moved past the brush, the carriage continues to rock in a clockwise direction, as at $g$, to raise the following end of the unit A from the entry conveying means and directively swing the leading end of said unit toward and onto a conveying means in the take-off end of the first section of the apparatus. The purpose of this rocking motion, as produced by the carriage, is to orient the unit so that the edge thereof will be continuously presented to the brush and the actual brushing or edge treating will occur when the face of the brush is substantially perpendicular to the affected edge of the unit as at $h$. This produces the same effective treating or cleaning action as would be obtained by passing a flat laminated unit or the like along a path substantially normal to the axis of the brush.

As the unit is received on the take-off conveying means, said means is caused to swing angularly downward to the end that as the following end of the unit is passed from between the rotating or traction rolls, the said carriage will be oriented so that the said end will be moving along the path of a plane substantially tangential to the rolls, as at $i$. The take-off conveying means is then caused to return to a substantially horizontal plane while the carriage is returned to its original position. As indicated at $j$, the laminated unit A is delivered from the take-off conveying means of the first section of the apparatus. As shown at $k$, the unit, while being similarly carried through the second section, is engaged by a wire brush along the opposite side $e$. Functionally, both sections of the apparatus operate in the same manner with the only exception being the transpositioning of the traction rolls and the wire brushes on opposite sides of the path of the units traverse through the apparatus.

More specifically, the laminated glass-plastic unit A is progressively delivered into the apparatus by means of a delivery conveyor system B, as shown in Figs. 1 and 4. At the entry end of hte apparatus, the laminated unit is received on a conveyor C and, while being carried thereon, is directed angularly downward until its leading end is engaged by guide roll D (Figs. 5 and 6). This roll is positioned to guide the leading end upwardly and along the plane of a line that is tangential to the opposed peripheries of traction and support rolls that are operatively carried within a rotatably mounted framework E.

Also contained within this framework is a rotating wire brush which is mounted on a carriage that is adapted to substantially reciprocate forward and back thereby enabling the wire brush to follow any longitudinal curvature existent in the edge of the laminated unit. The wire brush and the drive therefor is further mounted on the reciprocating carriage so that the working periphery of the brush will oscillate in a plane normal to the edge of the unit to the end that the full width of the brush is employed during the cleaning operation. Also this oscillatory motion carries the working face of the brush upwardly and downwardly across each corner to effectively remove minute glass particles adherent thereto.

As the leading end or tip of unit A passes between the support rolls, an electric control is activated which causes the framework E to be rocked about a horizontal axis and the entry conveyor C to be swung upwardly. These related actions are coordinated to adequately sustain the weight of the laminated unit and to move the framework so that the area of the unit engaged between the support rolls will be normal to the tangent plane therebetween. As will be more particularly hereinafter set forth, means is provided for controlling the rocking motion of the framework E according to the longitudinal curvature of the unit.

As the laminated unit passes through this framework E, it is received on a take-off conveyor F, which is adapted to swing downwardly under the control of a suitable timing cam. When the unit is bodily received on the conveyor F, the same is swung upwardly and the unit progresses toward a second entry conveyor G. At this time, one longitudinal edge of the glass-plastic unit has been treated by the rotating wire-brush.

The unit, in moving forwardly on conveyor G, sequentially passes through a wire-brushing framework H and is then received on a take-off conveyor J before being delivered again onto a subsequent production line conveyor. During movement of the unit through the framework H, however, the opposite longitudinal edge thereof is treated and to achieve this cleaning action, the traction and support rolls and wire-brush are positioned in opposition to their complementary parts in the framework E. Upon further examination of the drawings, it will thus become apparent that the cleaning apparatus consists of two structures, each having substantially duplicate conveyors and a wire-brushing framework interposed therebetween. In Fig. 4, the opposed mounting of the wire-brushes will be seen; however, since operatively they are mounted and driven in the same manner, the detailed description will be directed to that portion of the apparatus included in conveyors C and F and the interposed framework E.

Upon reference to Fig. 4, it will be seen that the conveyors C and F and framework E are positively driven from one power source 10 which includes a motor 11 and transmission unit 12. This unit through line shaft 13 is connected to a transmission unit 14 which generally drives shaft 15 of the entry conveyor C through chain 16. Shaft 15 at one end is coupled by chain drive 17 and through a clutch 18 to shaft 19 which drives delivery conveyor B. At its opposite end, shaft 15 through chain 20 drives clutch 21. This clutch, when engaged, operatively drives shaft 22 on which is mounted the control cam 23 for the entry conveyor C. Shaft 22 through chain 24 is coupled to shaft 25 for cam 26 which controls the rocking action of the framework E.

Line shaft 27 from transmission unit 12 generally operates transmission units 28 and 29. Unit 28 through shaft 30 and chain 31 furnishes power for driving the support rolls in framework E while transmission unit 29 through chain 32 drives shaft 33 of take-off conveyor F. At the outer end of shaft 33, a chain drive 34 connects said shaft to a clutch 35. This clutch by shaft 36 operates cam 37 which controls the swinging motion of take-off conveyor F. It is believed that this brief disclosure of the several power sources will greatly accelerate the understanding of the operation of the apparatus as the component elements thereof are described in sequence.

Now, with reference more particularly to Figs. 1, 3 and 4 it will be seen that the edge cleaning apparatus in its entirety is generally carried on a bed or base framework 38 which includes longitudinally disposed rails or channels 39 and transversed disposed channel members 40. In conventional manner, channels 39 and 40 are equipped with suitable angles 41 adapted to serve as supporting feet or parts of leveling devices for the apparatus.

At the entry end of the apparatus, channel members 40 fixedly carry a pair of spaced and vertically disposed columns 42 at the upper ends of which are attached transverse channels 43. These channels afford a support structure for centrally and longitudinally disposed frame members 44 on which the delivery conveyor B is generally mounted. In parallel relation to and outwardly of members 44, relatively short channels 45 are mounted on the ends of channels 43. Channels 45 carry pillow blocks 46 in which the shaft 15 of the entry conveyor C is journaled.

Figure 12:
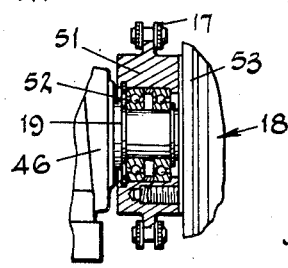
Fig. 12 is a vertical detail view as taken on line 12—12 of Fig. 11.
Figure 14:
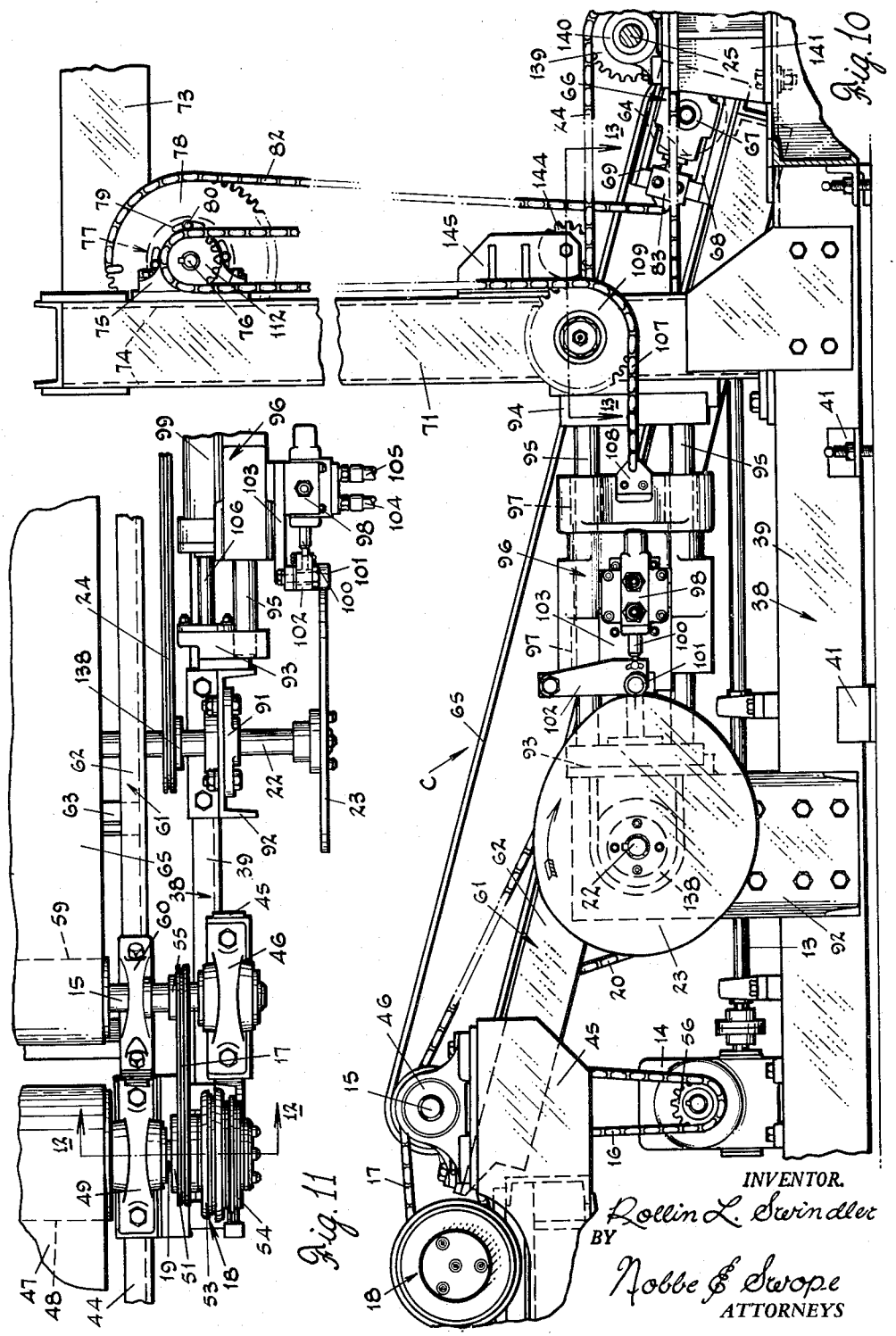
Fig. 14 is a side elevational view of the entry end of the apparatus as seen from the left-hand side of Fig. 7.
Figure 15:
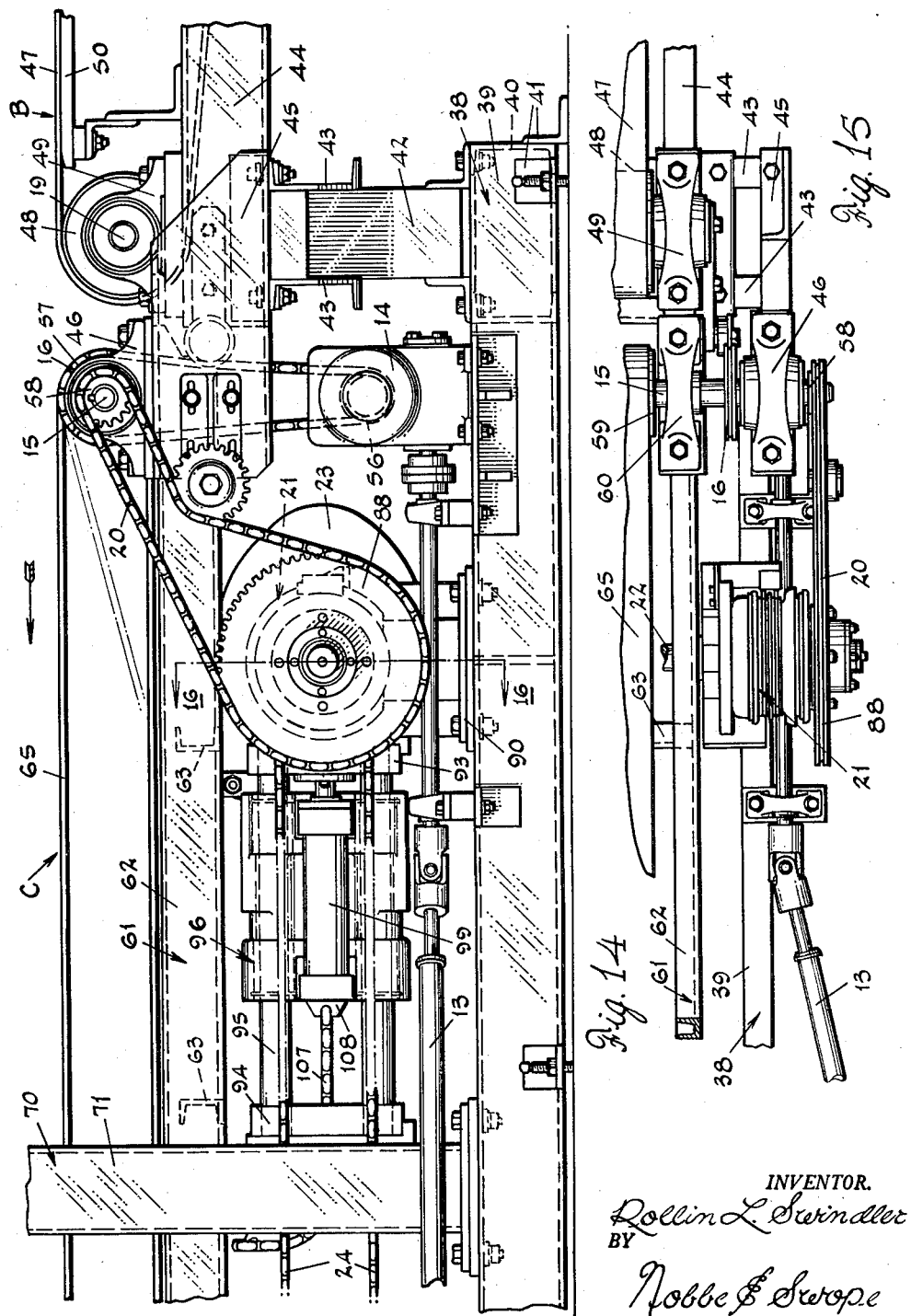
Fig. 15 is a fragmentary plan view of the entry end of the machine as seen in Fig. 14.

As illustrated in Figs. 7 and 14, the delivery conveyor B comprises an endless belt 47 which is entrained about rolls 48 (only one roll 48 being shown). Rolls 48 are rotatably supported by shafts or axles 19 that are journaled in pillow blocks 49 mounted on frame members 44. Means for supporting the belt 47 in its upper flight may be provided by a deck 50 suitably carried by the frame members 44. At one end of an axle 19, a sprocket 51 is supported by means of roller bearing 52 (Fig. 12). The sprocket is fixed to the driver portion 53 of magnetic clutch 18, while the driven portion 54 is fixedly connected to said axle shaft 19. Sprocket 51 is coupled to sprocket 55 on shaft 15 by chain 17 trained thereabout (Fig. 11). As previously mentioned, shaft 15 is driven from transmission unit 14 by means of chain 16 which is entrained about driver sprocket 56 and sprocket 57 keyed on said shaft (Fig. 7). At the same end of shaft 15 and outwardly of related pillow block 46, a sprocket 58 is mounted to drive magnetic clutch 21 through chain 20. The utility of magnetic clutches 18 and 21 will be more fully hereinafter set forth in the operation of the apparatus.

In addition to serving as a driving member, the shaft 15 is adapted to function as a support for the conveyor C. For this purpose, a belt roll 59 is centrally mounted on and suitably keyed to the shaft and adjacent each end of the roll, pillow blocks 60 for the frame 61 of the conveyor C are carried by said shaft. This frame comprises side members 62 and transversely disposed bracing members 63; the side members 62 at one of their ends having the pillow blocks 60 mounted thereupon so that the frame 61 bodily is adapted to swing radially about shaft 15 while the belt roll 59 is rotating therewith. A complementary belt roll 64 is mounted at the opposite end of the frame and an endless belt 65, trained about rolls 59 and 64, may be adjusted in tautness by means of the mountings 66 for roll 64. Conventionally, these mountings may include journal blocks 67 which are adjustably positioned relative to guide brackets 68 by means of screws 69.

The conveyor C is bodily counterbalanced by means of a weight system which, more particularly, is controlled by the cam 23 to swing said conveyor upwardly and then downwardly in timed relation to progress of a laminated unit through the framework E or the actual brushing area. This weight system is generally mounted on a superstructure 70 consisting of vertically disposed columns arranged in longitudinally related pairs 71 and 72 attached at their respective lower ends to the base channels 39, and with suitable bracing members 73 connecting their upper ends. Carried on the inner flanges 74 of columns 71 are pillow blocks 75 in which is journaled a transversely disposed shaft 76. Flanged hubs 77 are keyed on shaft 76 and a sprocket 78 is adjustably mounted on each hub. As viewed in Fig. 18, the sprocket 78 is provided with arcuate and concentrically arranged slots 79 through which screws 80 are threaded into the face of flange 81 of the hub. Each sprocket 78 has a chain 82 fixedly attached thereto and so as to be entrained about substantially three-quarters of its toothed periphery. Each chain 82 at its lower end is connected to the conveyor frame 61 by means of clips 83 fixed to the inner ends of the guide brackets 68. It will now become apparent that the free end of the conveyor can be transversely and horizontally balanced at one of its ends by loosening screws 80 to permit radial adjustment of one or the other of the sprockets 78. This will insure that the frame will swing upwardly and downwardly and the extent of such motion will be reflected in equal degree in the winding or unwinding of the chains 82 about their related sprockets 78. The swinging movement of the conveyor frame 61 is produced and controlled generally by means of the cam 23 which is indirectly adapted to cause reciprocal motion of a slide block with which the sprockets 78 are mechanically associated.

The shaft 22, on which cam 23 is mounted at its opposite end therefrom, is journaled in a bearing 84 mounted on bracket 85 and is axially projected through the magnetic clutch 21, the driven portion 86 of which is keyed thereto. The driver portion 87 of clutch 21 is rigidly associated with a sprocket 88 which, by means of contained bearing 89 is freely rotatable on shaft 22 (Figs. 16 and 17). Bracket 85 is mounted on base framework 38 by means of a reinforced pad 90 formed thereon. The opposite end of shaft 22, adjacent cam 23, is journaled in bearing 91 mounted on a vertically disposed channel 92 carried by a channel 39 of the base framework (Fig. 11).

Figure 13:
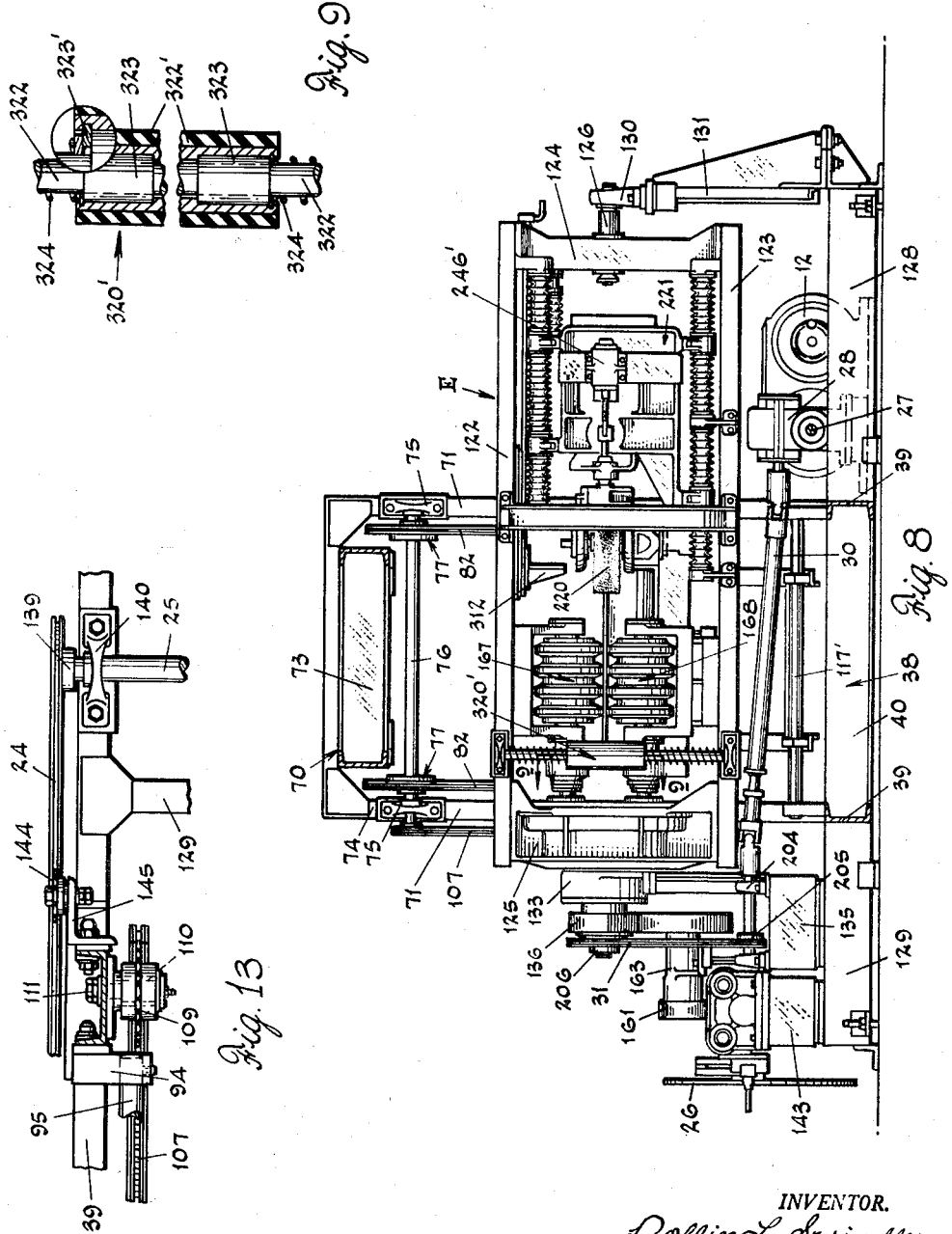
Fig. 13 is a horizontal sectional view as taken on line 13—13 of Fig. 10.

On the longitudinally opposed surfaces of channel 92 and column 71, there are mounted brackets 93 and 94 in which are affixed the ends of horizontally disposed and vertically spaced slide-rods 95. A slide block, generally designated by the numeral 96, is adapted to reciprocate on the rods and for this purpose is equipped with contained sleeve bearings 97. On its outermost vertically disposed surface, the block 96 has mounted a control valve 98 for a cylinder 99 (Fig. 14) which is mounted on the innermost vertically disposed surface of the block. The plunger 100 of valve 98 is affected by the contoured periphery of cam 23 by means of a roller 101 carried by arm 102. The arm 102 is swingably mounted on a plate 103 affixed to the block 96. The valve 98 is connected by suitable piping to a source of air under pressure and by flexible tubings 104 and 105 to the operative ends of cylinder 99. The piston rod 106 of said cylinder is fixedly secured at its outer end in the bracket 93 and accordingly when air is supplied through tubing 104 and against the contained piston on rod 106, the cylinder and slide-block 96 will be urged to the left as viewed in Fig. 10. This action will be transmitted to the free end of the conveyor C and will operate to swing the same upwardly. This transmission of movement is effected through chain 107 which is attached at one end to the block 96 by a clip 108. The chain is then trained about idler sprocket 109 which is journaled on bearing 110 mounted on a bolt 111 carried by column 71 (Fig. 13). The chain is directed upwardly, trained about sprocket 112 and its end, depending therefrom, carries a weight member 113. The sprocket 112 is fixed on the end of shaft 76 and as the block 96 is moved leftward (Fig. 10), the chain will be operable, and against the influence of weight member 113, to rotate sprocket 112 and consequently the shaft 76 whereby the sprockets 78 thereon will "wind" up the chains 82 to then raise the free end of the entry conveyor C.

However, until the laminated unit A has entered between the support rolls of the framework E there is no activity of magnetic clutch 21 and the conveyor C will remain angularly in its lowermost position which particular angle is only herein shown for purposes of explanation and consequently may be varied. As the unit A is carried downwardly on this conveyor, its leading end engages the guide roll D (Figs. 5 and 6).

The guide roll D is adapted to rotatably support the leading end of the laminated unit and, by reason of the roll's position, directively guide said unit end in an angularly upward path that is substantially in a plane tangential to said support rolls of the framework E. The guide roll essentially is comprised of rubber rollers 114 mounted on a support rod 115 that is carried at its ends in blocks 116. These blocks are affixed to the free ends of an angularly adjustable frame 117 that is pivotally mounted at its opposite end on a shaft 117' journaled in blocks 118 carried by the base framework 38. The free ends of frame are provided with pivotally mounted, slotted links 119 that are associated with adjusting nuts and bolts 120 carried by fixed blocks 121. The purpose of the links 119 is to permit adjustment of the guide roll D by radial swinging of the frame 117 and by this means change the elevation of the guide roll which will determine its relation to the angularity of the conveyor C, the angular positioning of the framework E and the predetermined curvature of the laminated unit to be edge cleaned.

The wire-brushing framework

This framework includes upper (122) and lower (123) horizontally disposed channels which are interjoined at their ends by means of a channel-shaped column 124 in one instance and an elongated gear case 125 in the other. The column 124 is formed in its medial area to support a stub axle 126 while the gear case 125 has an integrally formed hollow shaft 127 outwardly directed therefrom. To adequately support the associated elements of the framework E and to accommodate them transversely in the path of the laminated unit's movement, the channels 122 and 123 are relatively long and extend considerably outward beyond the pairs of columns 71 and 72 between which the framework E is positioned (Fig. 8). It is to be noted that in Figs. 8, 22, 23, 24 and 29 the framework E is located in substantially a perpendicular position for clarity of illustration, while in Figs. 19 and 21, said framework is oriented, by way of example, in one typical, angularly disposed position for receiving a laminated unit and as herein so described.

The framework, generally speaking, is supported on trunnions that are mounted on transversely disposed additions of the base framework 38, as shown in Fig. 4. These framework additions 128 and 129 are channel structures and substantially rectangular in outline. Thus the axle 126 is journaled in a pillow block 130 mounted on a bracket 131 carried by structure 128 while the hollow shaft 127 (Fig. 27) is similarly journaled in a bearing 132 contained within a housing 133. In this particular instance, the housing 133 is supported on the bracket 134 which in turn is mounted on an elevated frame 135 integrally a part of structure 129.

Outwardly of the bearing 132, hollow shaft 127 on its periphery has mounted thereon a spur gear 136 which is positioned from said bearing by a spacer collar 137. The gear 136 constitutes the driven element of a gear train which operates to bodily rock the framework and which is set in motion upon active rotation of the shaft 22. For this purpose, a sprocket 138 on shaft 22 is coupled to a sprocket 139 on shaft 25 by the chain 24 entrained thereabout. The shaft 25, adjacent sprocket 139 and at its inner end, is journaled in a pillow block 140 mounted on a bracket 141 carried by the base framework 38 while its outer end is journaled in pillow block 142 mounted on an elevated frame 143, similar to the elevated frame 135 and similarly formed as an integral part of the structure 129.

Figures 25, 26:
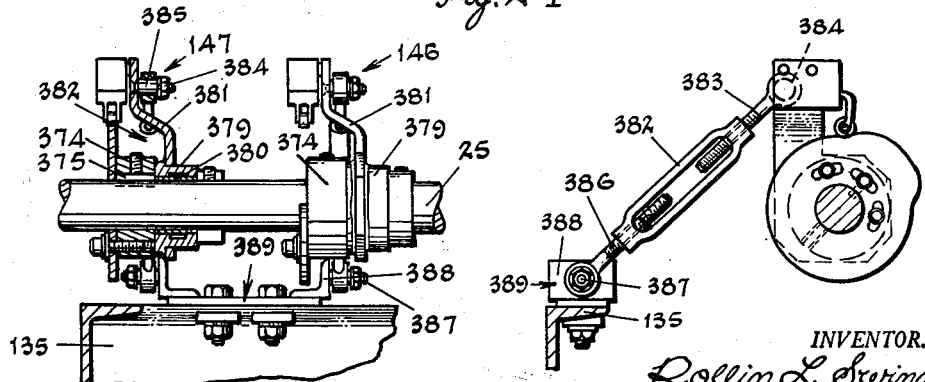
Fig. 25 is a side elevational view partially in section of devices for controlling the interrelated operations of the apparatus.
Fig. 26 is a front elevational view of the control devices.

If desired, a tensioning idler sprocket 144 may be rotatably carried by a bracket 145 mounted on a column 71; said sprocket being adapted to mesh with chain 24 in the upper flight thereof. Between the bearings 140 and 142, the shaft 25 has mounted control devices, generally designated at 146 and 147, which, as shown in Figs. 25 and 26 and as will be hereinafter more fully disclosed, in one instance influences operation of the clutch 21 and in the other instance influences operation of the clutch 35. Outwardly of pillow block 142, the shaft 25 fixedly carries the cam 26.

By reason of its developed contour, the cam 26 is instrumental in driving the spur gear 136 when the shaft 25 and a cam thereon are operatively driven from the shaft 22. Since the shaft 22 carries the cam 23, it will be apparent that rotation of cams 23 and 26 will be in timed relation. Cam 26 operates the gear 136 by means of a slide-block 148 which is mounted for reciprocal motion on rods 149 carried at their ends in brackets 150 and 151. On a mounting plate 152, slide block 148 supports a control valve 153 suitably connected to a source of air pressure. The plunger 154 of valve 153 is influenced by rotation of cam 26 through a roller 155 on arm 155' that is pivotally mounted on plate 152. The resultant action of the plunger 154 directs pressure through flexible tubings 156 and 157 to a cylinder 158 carried by the slide-block 148 on its under surface. The piston rod 159 of this cylinder is fixed at its outer end in the bracket 150 and operates to produce reciprocal motion of the slide block when pressure is applied to either end of the fixedly associated cylinder.

On its upper surface, the slide block carries a gear rack 160 which is meshed with a spur gear 161. The gear 161 is fixedly mounted on a shaft 162 journaled in pillow block 163 mounted on an elevated frame 164 which forms an integral part of the structure 129. On its opposite end, the shaft 162 has a relatively larger spur gear 165 that meshes with the gear 136 on shaft 127 to the end that when the slide-block 148 is carried to the right as viewed in Fig. 19, the rack 160 drives commonly mounted gears 161 and 165 in a counterclockwise direction of rotation with a consequent clockwise rotation of spur gear 136 and rocking motion of the framework E from the angular position substantially as shown in full line in Figs. 19 and 21 to the broken line position indicated in Fig. 21. As viewed in Fig. 21 in full line, the framework E is angularly disposed to properly receive the leading end of the laminated unit A as it is upwardly directed by means of the guide roll D, substantially as indicated in broken line.

When the framework has been rocked to the second position as indicated in broken line, the laminated unit A will be substantially supported on the take-off conveyor F which is then located in its lowermost angular position as also indicated in broken lines in Figs. 14 and 38. Since the edge treating apparatus is adapted to handle sheets or laminated units of different curvatures, it is to be understood that by changing the "timing" of general operation, the conveyors C and F and the framework E will not only move in accordance with the requirements of a different curvature but will be properly positioned to receive and discharge the same. That is to say—by replacing cams 23 and 26 by cams of different contours; adjusting the angle of the conveyor C and framework E and changing the elevational position of the guide roll D, the machine can be quickly adjusted. This is of course also true of the conveyors G and J and the interposed framework H in the second section of the machine.

Now, within the framework E, traction and support rolls 166 are continuously driven from line shaft 27, transmission unit 28, shaft 30 and chain 31. More specifically, in Figs. 24 and 27, it will be seen that the traction rolls 166 are arranged in vertically opposed upper (167) and lower (168) rows. Generally speaking, the upper row of rolls 167 is adapted to operatively move the laminated glass sheet by rolling contact therewith while the lower row of rolls 168 simultaneously act to support the sheet and co-operate to operatively move the same through the pass therebetween. The rolls or rollers are generally formed of a common structure, each having an inner core or hub 169 and an outer periphery or rim 170 of such relatively soft material, such as rubber, which is suitably vulcanized onto said hub. These rollers of each row are spaced along concentric sleeves 171 by collars 172; the alternately arranged rollers and colars being more or less fixedly mounted on their respective sleeves by means of a lockring 173 at one end thereof and by means of a lock-nut 174 threaded onto the opposite end. The sleeve 171 of upper row 167 is mounted on a related shaft 175 and keyed for rotation therewith as at 176 while the complementary sleeve 171 of lower row 168 is mounted on shaft 177 and similarly keyed thereto.

In the instance of the upper row 167, the shaft 175 therefor is journaled in bearings 178 mounted in the end walls 179 of a housing 180 that is fixedly secured to the web of framework channel 122. On the other hand, shaft 177 of the lower row 168 is journaled in bearings 181 mounted in the end walls 182 of a swingably mounted housing 183.

Figure 24:
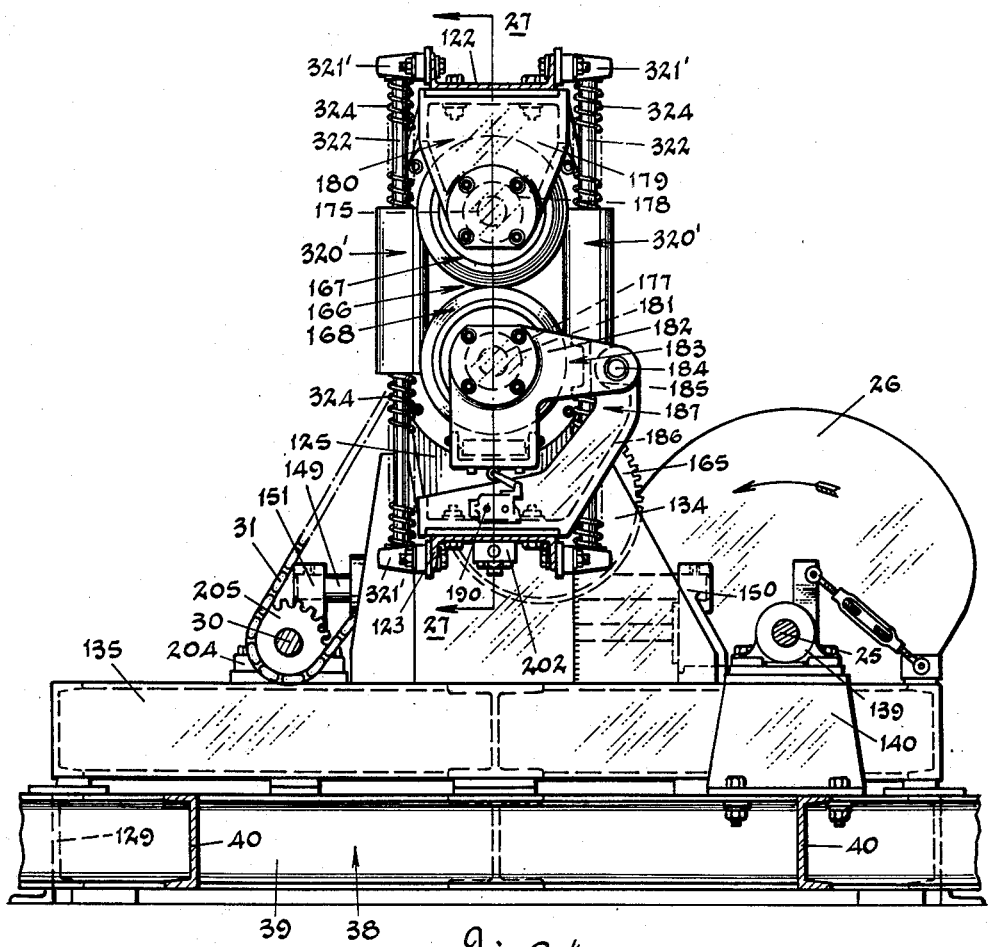
Fig. 24 is a transverse sectional view of the carriage as taken on line 24—24 of Fig. 22.

The housing 183, as shown in Fig. 24, is pivotally mounted by means of a rod 184, the central portion which is supported in hub portion 185 formed in the upwardly rising wall 186 of bracket 187. This bracket is fixedly secured to the web of the lower framework channel 123. Housing 183 is adapted to urge the lower row of rollers into resiliently, rolling contact with the upper row of rollers by means of an adjustable, spring sustained mechanism generally designated by the numeral 188. This mechanism not only urges the lowermost rollers upwardly but also supports the housing 183 with its bottom wall 189 out of active engagement with a micro-switch 190 mounted on an end wall of bracket 187. The switch, as will be more fully hereinafter set forth, controls the operation of magnetic clutch 21.

As shown in Figs. 27 and 28, the mechanism 188 includes a rod 191 having an enlarged, cross-drilled head 192. This head is received between the ends of a block 193 secured on the upper surface of the wall 189 of housing 183 and aligned with an aperture 194 therein. A pin 195 carried by the block 193 supports the rod 191 by its head 192 which depends through aperture 194. In vertical alignment with the aperture 194, an aperture 196 is provided in the base of the bracket 187 and the channel 123. The rod 191 projects downwardly therethrough and by means of an externally threaded sleeve 197 is slidably guided by means of an adjusting member 198 having a tapped head 199 and an axle portion 200. The sleeve 197 is received into the tapped head 199 and outwardly thereof is provided with a locknut 201. The axle 200 is more or less journaled in a block 202 rigidly secured on the undersurface of the web of channel 123. Interposed between the head 192 of rod 191 and sleeve 197, is a coil spring 203 which is adapted to resiliently support the housing 183 through said rod and its association with the block 193. Now, when the lock-nut 201 is threaded outwardly, the sleeve 197, by being advanced or retracted with respect to the head 199, will alter the compression characteristics of the spring 203 and accordingly adjust the pressure of rolling contact between the upper and lower rows 167 and 168 respectively of rollers 166.

The related shafts 175 and 177 of rollers 166 are generally and continuously driven through the sprocket chain 31 from the transmission unit 28. In Fig. 8, the shaft 30 will be seen to be journaled in pillow blocks 204 that are mounted on elevated frame 135. Between bearing blocks 204, shaft 30 fixedly carries a sprocket 205 which is coupled to a sprocket 206 by the chain 31, as seen in Fig. 7; sprocket 206 being keyed to the outer end of a shaft 207 journaled by bearings 208 in the axial bore 209 of hollow shaft 127 (Fig. 27). The inner end of shaft 207 within the gear casing 125 is equipped with a keyed spur gear 210. The gear 210 is meshed with a gear 211 on a shaft 212 which also mounts spur gear 213; shaft 212 being journaled in bearings 214 in the casing 125. Gear 213 is meshed with spur gear 215 on shaft 216 likewise suitably journaled in the gear casing.

The shaft 212 through universal joint 217 is connected to shaft 177 for driving the lower rollers 168 while shaft 216 by universal joint 218 is connected for similar purposes to the shaft 175. The universal joints 217 and 218 are provided to transmit power to the rows 167 and 168 despite any slight axial displacement that will naturally occur when the laminated unit A is passing therebetween as shown in Fig. 22. A suitably flexible sleeve 219 may be employed on each universal joint to protect the same from undesired abrasive, dust and/or flying particles of the removed, hardened plastic.

As best seen in Figs. 23, 29 and 32, in the end of the framework E, opposite from the supporting rolls 166, means is provided for mounting a power-driven wire brush 220 which is constantly urged against the span of one longitudinal side edge of the laminated unit A. Basically, the brush is mounted in the said framework by means of a carriage, generally designated at 221, that is adapted to urge the brush toward the rolls 166. On this carriage 221, there is pivotally mounted a frame, designated by the numeral 222, that is caused to oscillate in a substantially vertical plane which oscillating motion bodily swings the brush in such a manner as to utilize the entire width of its periphery. This has been found to effectively engage the corners of the sheets' edges and abrade small, rough particles of glass therefrom; such particles remaining when the sheets are scored. Also this motion tends to reduce "grooving" of the brush or other irregular wearing of its bristles. The brush is specifically carried on the frame by a holder 223 which is spring loaded to initially sustain any edgewise pressure to which the brush is subjected.

More specifically, the carriage 221 has a vertically disposed wall 221a, a horizontal integrally formed top wall 221b and a horizontal integral bottom wall 221c. It is slidably mounted on rods 224 and 225 by means of bearing blocks 226, which as best seen in Figs. 8 and 32 are arranged on and fixedly secured to the top and bottom walls 221b and 221c of the carriage. The blocks each contain bearing sleeves 227. The rod 224, associated with the upwardly disposed blocks 226, is fixedly mounted at one of its ends in an ear 228 integrally formed on the column 124 while at the other end it is similarly mounted in an ear portion 229 of a tie-bracket 230 affixed at its ends to the channels 122 and 123. The rod 225 is likewise mounted at one end in an ear 231 on column 124 while medially of its length and at its opposite end, said rod is fixedly supported in brackets 232 similarly formed and attached to the channel 123. Each of the blocks 226, the ears 228, 229 and 231 and brackets 232 is suitably tapped to receive screws 233 by means of which the ends of bellowlike, flexible sleeves 234 can be clamped thereagainst by plates 235 (Fig. 33). In each instance the sleeves 234 enclose a section of either the rod 224 or 225 to protect the same and the bearing sleeves 227 from abrasion.

On the upper side of the carriage 221 a laterally-extending integrally formed platform 236 is provided for supporting a cylinder 237. As shown in Fig. 34, the piston rod 238 thereof is generally connected at its outer end and by means of a clevis 239 to a stud 240 fixedly mounted in a boss 241 of column 124. The clevis 239 is contained within a tubular fitting 242 which at its outer end supports one end of flexible sleeve 243 which protects rod 238 from abrasion. Sleeve 243 is attached at its opposite end to the cylinder block 244. The cylinder 237 is adapted to resiliently urge the brush 220 against the edge of the laminated unit or windshield A thereby halting operation of shafts 23 and 25. Cam plate 378 of control device 373 similarly deactivates magnetic clutch 35 upon one revolution of shaft 36.

Upon return of the take-off conveyor F to a substantially horizontal position, the laminated glass-plastic unit A is carried toward and received on the entry conveyor G. This conveyor is constructed in the same manner as the conveyor C and functionally operates to similarly swing upwardly from an initial downwardly inclined position in timed sequence with the rocking motion of the framework H. The previous detailed description of the conveyor C, the utility of its control cam 23 and the power source therefor are believed sufficiently comprehensive and the elements, as therein set forth, are as equally applicable for the conveyor G.

The same is substantially true with reference to the framework H. This framework is in every respect a duplicate of the previously described framework E with the noted exception that the rolls 166 and the carriage 221 for the wire-brush 220 are oppositely positioned so as to support and edge clean the opposite longitudinal side of the laminated unit.

Discharging from the framework H, the unit, now completely edge-cleaned on both of its longitudinal sides is received on the take-off conveyor J and then is carried forwardly to a subsequent conveyor line by which the units are carried away from the edge cleaning apparatus.

*Complete operation of the edge treating apparatus*

In order that the various controls for the apparatus can now be suitably identified and their respective functions adequately described, reference is now made to Fig. 38, in connection with the other figures. It will thus be recalled that the bent laminated safety glass sheets or units A are received on the belt 47 of the delivery conveyor B. One of the rolls 48 thereof is mounted on shaft 19 which is driven through magnetic clutch 18 and by chain 17 from shaft 15. Clutch 18 is normally energized and, for this purpose, is connected to one source line of electrical current 395 by line 396 and to the opposite source line 397 by line 398 through normally closed contacts 399 and 400 of relay switch 401. The circuit of coil 402 for switch 401 is completed through normally open switch 403 to line 397 and by line 404 to source 395. Switch 403 may be characterized as a conventional "spacing" switch in order that laminated units will progress to the edge cleaning apparatus in sequently spaced intervals of time, or for convenience it may be as herein shown as a manual switch controllable by an operator. In either case, closure of the switch 403 energizes coil 402 to open contacts 399 and 400 and close contacts 400 and 405. This act will de-energize the clutch 18 and simultaneously by line 406 complete the circuit to a brake 407 for said clutch and thence by line 408 to opposite source line 395. Shaft 19 and the belt 47 of conveyor B accordingly will now be halted without interrupting operation of the belt 65 of the conveyor C as produced by the shaft 15.

During normally occurring delivery of bent laminated glass sheets to the conveyor C, each glass sheet is carried forwardly until by separating the lower rolls 168 from the upper rolls 167, they depress the housing 183 to close microswitch 190. This switch is connected to source line 397 and by line 409 to the coil 410 of relay switch 411; the circuit being completed by line 412 to source line 395. When energized, coil 410 disengages contacts 413—414 to open the circuit of lines 415 and 416 through the brake 417 for the clutch 21. Simultaneously contacts 414—418 complete a circuit by lines 419—420 to energize clutch 21 to drive shaft 22. Shaft 22 operates cam 23 and generally through chain 24, shaft 25 of cam 26.

Control cam 23, when rotating through one revolution, influences the valve 98 to direct pressure from tubing 104 to the cylinder 99 and thus cause the slide-block to move to the left (Fig. 10) and act to raise the conveyor frame 61 to a position approaching the horizontal. (The actual arc through which the frame 61 is intended to swing upwardly and downwardly depends upon the curvature of the laminated glass sheet to be cleaned and also the timed relation of the swinging action to the rocking motion of the framework E). After revolving substantially one-half to three-quarters of a full cycle, according to the bent curvature of the glass sheets the contour of the cam 23 influences the valve 98 to reverse the direction of pressure to cylinder 99 whereby the chain 107 will produce through sprocket 112, rotation of shaft 76 in the opposite direction to return the entry conveyor C to its orignal angularly downwardly inclined position.

However, simultaneous revolution of the cam 26 causes the rocking motion of framework E. This cam is developed to produce an initial, substantially slow movement compatible to the upwardly-rising leading end of the bent laminated glass sheet or unit. When this end area passes between the support rolls, cam 26 causes an accelerated rocking motion as the sharply bent corner area approaches and enters between rolls 166 which action enables the "worked" edge area of the unit and the brush 220 to be maintained in the proper perpendicular relationship. In timed relation to the central span of the substantially shallow curved central area of the unit, cam 26 produces a rocking motion at a reduced rate of operation which continues until the sharply bent corner area adjoining the upwardly-rising following end of the unit A approaches the support rolls. The contour of the cam will then again increase the speed of the rocking motion; followed by a final period of slower motion in a clockwise direction. Of course, the degree of angle through this framework E moves and the various periods of differing rates of speed are controlled by the contour of the cam 26 and can be changed to suit laminated units of differing curvature.

Thus as the cam 26 is rotated, the valve 153 will direct pressure at proportional rate through tubing 156 to cylinder 158 and thereby drive the gear rack 160 and the train of gears 161, 165 and 136 to rock the framework E. When the clockwise rocking motion of the framework has reached its limit as determined by the angle of the said framework at which the laminated unit is discharged therefrom, the remainder of the cam periphery is developed to rock the framework in a counterclockwise direction and at a substantially rapid rate of motion.

Also during rotation of the shaft 25 and cam 26, cams 376 and 377 of control devices 146 and 147 respectively on said shaft likewise are revolved and at substantially more than one-half of a full revolution, cam 376 activates micro-switch 421 to close the contacts of same. This completes a circuit from source line 397 by line 422 to coil 423 or relay switch 424 and through line 425 to opposite source line 395. When energized, coil 423 opens circuit to a clutch brake 426 through lines 397, 427, 428 and 395 and contacts 429—430 to release magnetic clutch 35. Then as a circuit is completed at contacts 429—431, by lines 397, 432, 433 and 395, clutch 35 is engaged to drive shaft 36 by chain 34. Shaft 36 rotates cam 37 and thereby influences direction of pressure from valve 357 to cylinder 358 through tubing 363. Cylinder 358 operates slide block 356 to rotate shaft 342 through chain 366 and thereby allow the take-off conveyor F to swing downwardly as the leading end of the laminated unit A is received thereupon. Shaft 36 also rotates cam 378 of control device 373.

Now as the framework E arrives at its original inclined position as shown in full line in Fig. 21, shaft 25, cam 26 and particularly cam 377 of control device 147 will have described one full revolution and said cam will close contacts of a micro-switch 434. This will complete a circuit by lines 397, 435, 436 and 395 through coil 437 of relay switch 411 whereupon contacts 414—418 will be opened to disengage magnetic clutch 21 and contacts 413—414 will be closed to reestablish the circuit by lines 415 and 416 for clutch brake 417. The entry conveyor C will now again be positioned as shown in Fig. 10 and the framework E as shown in Figs. 19 and 21.

During continued rotation of the cam 37, however, and after substantially more than half of its rotation, the take-off conveyor F will have been caused to swing downwardly to its lowermost determined angle and will, as pressure is directed through tubing 364 from valve 357 to cylinder 358, be returned upwardly as the slide-block 356 is carried to the right (Fig. 37). When its original position in a substantially horizontal plane is reached by said conveyor, the cam 37 and shaft 36 will have substantially completed one full revolution. At this time, cam 378 of control device 373 engages micro-switch 438 to complete a circuit by lines 397, 439, 440 and 395 through coil 441 of relay switch 424. When energized, coil 441 operates to open contacts 430—431 to disengage magnetic clutch 35 and then close contacts 429—430 to reestablish lines 427—428 to clutch brake 426 whereby rotation of shaft 36 at clutch 35 will be halted.

At this time, the edge d of the laminated glass sheet or unit A will have been treated to remove the undersired plastic fringe material and rough glass particles. And the said unit will then be carried forwardly from the take-off conveyor F to the entry conveyor G. Proceeding forwardly on this conveyor, the leading edge of the laminated unit is directed upwardly toward and so as to be received between the rolls 166 of the framework H. Now, as previously described, a micro-switch, such as the switch 190, will be closed and a magnetic clutch, such as the clutch 21, will be engaged to drive the shafts which rotate cams, such as the cams 23 and 26. This action will produce an upwardly swinging motion of the entry conveyor G and the timed clockwise rocking motion of the framework H. During this course of events, the longitudinal side edge e of the glass sheet A will be engaged by a wire brush 220 in framework H so as to be progressively edge cleaned thereby. When the cam 26 and likewise a cam, such as the cam 376, has been rotated through more than half of its revolution, the magnetic clutch for the take-off conveyor J will be engaged to cause said conveyor to be swung downwardly and then upwardly.

It is thus believed apparent that each of the entry conveyors C and G, the frameworks E and H and the take-off conveyors F and J of the edge treating apparatus may be and substantially are of the same structure. Moreover, suitably developed cams can be employed to produce the desired sequentially occurring phases of operation for each of the conveyors and frameworks, one in timed relation to another. Likewise, without repetitively describing the required circuitry and pressure systems, the diagrammatic illustration of Fig. 38 is applicable in equal manner for control of the conveyors G and J and the interposed framework H as well as for the conveyors C and F and the related framework E.

Essentially, the apparatus in its entirety will now be understood to operate first along one side and then along the other to rapidly and completely remove undesired material from the edges of a bent laminated safety glass sheet in a highly efficient manner as the same is carried forwardly along a conveyor line. Also that each of the involved conveyors and/or frameworks can be caused to swing or rock in any desired timed relation according to the bent curvature of the article to be processed therethrough.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

I claim:

1. An apparatus for treating the edges of a bent laminated glass sheet, comprising, in combination, conveyor means for moving the bent sheet along a path disposed substantially transversely to an axis of curvature thereof, a pair of axially parallel traction rolls disposed transversely of said path and between which said sheet is passed, brushing means engageable with one edge of the sheet as it moves along said path, means positioned to engage the opposite edge of said sheet to maintain the first edge in contact with said brushing means, means mounting said rolls and said brushing means for swinging movement as a unit about a substantially horizontal axis, and means for swinging said rolls and brushing means about said axis from one side to the other of a vertical plane to dispose the same in position to receive the leading curved end of the bent sheet and to subsequently discharge said sheet from therebetween.

2. An apparatus of the character defined in claim 1, including means located between said conveyor means and said traction rolls and engageable by said sheet for guiding the leading curved end thereof into the pass between said traction rolls.

3. An apparatus of the character defined in claim 1, in which means is provided for producing a progressively variable rate of swinging motion of the traction rolls and the brushing means according to the curvature of the glass sheet.

4. An apparatus of the character defined in claim 3, in which said means for producing the progressively variable rate of swinging motion of the rolls and brushing means includes a rotatable cam.

5. An apparatus of the character defined in claim 4, which includes means to rotate said cam when the glass sheet is passed between the pair of rolls, and means operatively connecting the swinging means for the pair of rolls and the brushing means with the rotatable cam.

6. An apparatus of the character defined in claim 1, in which means is provided for mounting said brushing means for rotation about an axis substantially perpendicular to the axes of the said rolls.

7. An apparatus of the character defined in claim 6, in which means is provided for oscillating said brushing means in substantially the plane of its perpendicularly disposed axis to move said brushing means transversely of and in engagement with the edge of the sheet to be treated.

8. An apparatus of the character defined in claim 7, including fluid means for maintaining said brushing means in engagement with an adjacent edge of the glass sheet, and means controlling said fluid means to allow for movement of said brushing means transversely of the sheet to compensate for the curvature of the edge of said sheet.

9. An apparatus of the character defined in claim 1, in which the means engaging one edge of the glass sheet engages the edge thereof in continuous rolling contact, while the opposite edge of the sheet is treated by said brushing means.

10. An apparatus of the character defined in claim 9, in which said pair of traction rolls are interposed between said edge engaging means, said edge engaging means including a pair of vertically disposed rolls equally spaced from said supporting rolls to balance the thrust of engagement of said brushing means against the opposite edge of the glass sheet moving between said traction rolls.

11. An apparatus of the character defined in claim 10, in which each edge engaging roll is resiliently mounted for movement to follow the edge of the curved glass sheet.

thereby halting operation of shafts 23 and 25. Cam plate 378 of control device 373 similarly deactivates magnetic clutch 35 upon one revolution of shaft 36.

Upon return of the take-off conveyor F to a substantially horizontal position, the laminated glass-plastic unit A is carried toward and received on the entry conveyor G. This conveyor is constructed in the same manner as the conveyor C and functionally operates to similarly swing upwardly from an initial downwardly inclined position in timed sequence with the rocking motion of the framework H. The previous detailed description of the conveyor C, the utility of its control cam 23 and the power source therefor are believed sufficiently comprehensive and the elements, as therein set forth, are as equally applicable for the conveyor G.

The same is substantially true with reference to the framework H. This framework is in every respect a duplicate of the previously described framework E with the noted exception that the rolls 166 and the carriage 221 for the wire-brush 220 are oppositely positioned so as to support and edge clean the opposite longitudinal side of the laminated unit.

Discharging from the framework H, the unit, now completely edge-cleaned on both of its longitudinal sides is received on the take-off conveyor J and then is carried forwardly to a subsequent conveyor line by which the units are carried away from the edge cleaning apparatus.

*Complete operation of the edge treating apparatus*

In order that the various controls for the apparatus can now be suitably identified and their respective functions adequately described, reference is now made to Fig. 38, in connection with the other figures. It will thus be recalled that the bent laminated safety glass sheets or units A are received on the belt 47 of the delivery conveyor B. One of the rolls 48 thereof is mounted on shaft 19 which is driven through magnetic clutch 18 and by chain 17 from shaft 15. Clutch 18 is normally energized and, for this purpose, is connected to one source line of electrical current 395 by line 396 and to the opposite source line 397 by line 398 through normally closed contacts 399 and 400 of relay switch 401. The circuit of coil 402 for switch 401 is completed through normally open switch 403 to line 397 and by line 404 to source 395. Switch 403 may be characterized as a conventional "spacing" switch in order that laminated units will progress to the edge cleaning apparatus in sequently spaced intervals of time, or for convenience it may be as herein shown as a manual switch controllable by an operator. In either case, closure of the switch 403 energizes coil 402 to open contacts 399 and 400 and close contacts 400 and 405. This act will de-energize the clutch 18 and simultaneously by line 406 complete the circuit to a brake 407 for said clutch and thence by line 408 to opposite source line 395. Shaft 19 and the belt 47 of conveyor B accordingly will now be halted without interrupting operation of the belt 65 of the conveyor C as produced by the shaft 15.

During normally occurring delivery of bent laminated glass sheets to the conveyor C, each glass sheet is carried forwardly until by separating the lower rolls 168 from the upper rolls 167, they depress the housing 183 to close microswitch 190. This switch is connected to source line 397 and by line 409 to the coil 410 of relay switch 411; the circuit being completed by line 412 to source line 395. When energized, coil 410 disengages contacts 413—414 to open the circuit of lines 415 and 416 through the brake 417 for the clutch 21. Simultaneously contacts 414—418 complete a circuit by lines 419—420 to energize clutch 21 to drive shaft 22. Shaft 22 operates cam 23 and generally through chain 24, shaft 25 of cam 26.

Control cam 23, when rotating through one revolution, influences the valve 98 to direct pressure from tubing 104 to the cylinder 99 and thus cause the slide-block to move to the left (Fig. 10) and act to raise the conveyor frame 61 to a position approaching the horizontal. (The actual arc through which the frame 61 is intended to swing upwardly and downwardly depends upon the curvature of the laminated glass sheet to be cleaned and also the timed relation of the swinging action to the rocking motion of the framework E). After revolving substantially one-half to three-quarters of a full cycle, according to the bent curvature of the glass sheets the contour of the cam 23 influences the valve 98 to reverse the direction of pressure to cylinder 99 whereby the chain 107 will produce through sprocket 112, rotation of shaft 76 in the opposite direction to return the entry conveyor C to its orignal angularly downwardly inclined position.

However, simultaneous revolution of the cam 26 causes the rocking motion of framework E. This cam is developed to produce an initial, substantially slow movement compatible to the upwardly-rising leading end of the bent laminated glass sheet or unit. When this end area passes between the support rolls, cam 26 causes an accelerated rocking motion as the sharply bent corner area approaches and enters between rolls 166 which action enables the "worked" edge area of the unit and the brush 220 to be maintained in the proper perpendicular relationship. In timed relation to the central span of the substantially shallow curved central area of the unit, cam 26 produces a rocking motion at a reduced rate of operation which continues until the sharply bent corner area adjoining the upwardly-rising following end of the unit A approaches the support rolls. The contour of the cam will then again increase the speed of the rocking motion; followed by a final period of slower motion in a clockwise direction. Of course, the degree of angle through this framework E moves and the various periods of differing rates of speed are controlled by the contour of the cam 26 and can be changed to suit laminated units of differing curvature.

Thus as the cam 26 is rotated, the valve 153 will direct pressure at proportional rate through tubing 156 to cylinder 158 and thereby drive the gear rack 160 and the train of gears 161, 165 and 136 to rock the framework E. When the clockwise rocking motion of the framework has reached its limit as determined by the angle of the said framework at which the laminated unit is discharged therefrom, the remainder of the cam periphery is developed to rock the framework in a counterclockwise direction and at a substantially rapid rate of motion.

Also during rotation of the shaft 25 and cam 26, cams 376 and 377 of control devices 146 and 147 respectively on said shaft likewise are revolved and at substantially more than one-half of a full revolution, cam 376 activates micro-switch 421 to close the contacts of same. This completes a circuit from source line 397 by line 422 to coil 423 or relay switch 424 and through line 425 to opposite source line 395. When energized, coil 423 opens circuit to a clutch brake 426 through lines 397, 427, 428 and 395 and contacts 429—430 to release magnetic clutch 35. Then as a circuit is completed at contacts 429—431, by lines 397, 432, 433 and 395, clutch 35 is engaged to drive shaft 36 by chain 34. Shaft 36 rotates cam 37 and thereby influences direction of pressure from valve 357 to cylinder 358 through tubing 363. Cylinder 358 operates slide block 356 to rotate shaft 342 through chain 366 and thereby allow the take-off conveyor F to swing downwardly as the leading end of the laminated unit A is received thereupon. Shaft 36 also rotates cam 373 of control device 373.

Now as the framework E arrives at its original inclined position as shown in full line in Fig. 21, shaft 25, cam 26 and particularly cam 377 of control device 147 will have described one full revolution and said cam will close contacts of a micro-switch 434. This will complete a circuit by lines 397, 435, 436 and 395 through coil 437 of relay switch 411 whereupon contacts 414—418 will be opened to disengage magnetic clutch 21 and contacts 413—414 will be closed to reestablish the circuit by lines 415 and 416 for clutch brake 417. The entry conveyor C will now again be positioned as shown in Fig. 10 and the framework E as shown in Figs. 19 and 21.

During continued rotation of the cam 37, however, and after substantially more than half of its rotation, the take-off conveyor F will have been caused to swing downwardly to its lowermost determined angle and will, as pressure is directed through tubing 364 from valve 357 to cylinder 358, be returned upwardly as the slide-block 356 is carried to the right (Fig. 37). When its original position in a substantially horizontal plane is reached by said conveyor, the cam 37 and shaft 36 will have substantially completed one full revolution. At this time, cam 378 of control device 373 engages micro-switch 438 to complete a circuit by lines 397, 439, 440 and 395 through coil 441 of relay switch 424. When energized, coil 441 operates to open contacts 430—431 to disengage magnetic clutch 35 and then close contacts 429—430 to reestablish lines 427—428 to clutch brake 426 whereby rotation of shaft 36 at clutch 35 will be halted.

At this time, the edge $d$ of the laminated glass sheet or unit A will have been treated to remove the undesired plastic fringe material and rough glass particles. And the said unit will then be carried forwardly from the take-off conveyor F to the entry conveyor G. Proceeding forwardly on this conveyor, the leading edge of the laminated unit is directed upwardly toward and so as to be received between the rolls 166 of the framework H. Now, as previously described, a micro-switch, such as the switch 190, will be closed and a magnetic clutch, such as the clutch 21, will be engaged to drive the shafts which rotate cams, such as the cams 23 and 26. This action will produce an upwardly swinging motion of the entry conveyor G and the timed clockwise rocking motion of the framework H. During this course of events, the longitudinal side edge $e$ of the glass sheet A will be engaged by a wire brush 220 in framework H so as to be progressively edge cleaned thereby. When the cam 26 and likewise a cam, such as the cam 376, has been rotated through more than half of its revolution, the magnetic clutch for the take-off conveyor J will be engaged to cause said conveyor to be swung downwardly and then upwardly.

It is thus believed apparent that each of the entry conveyors C and G, the frameworks E and H and the take-off conveyors F and J of the edge treating apparatus may be and substantially are of the same structure. Moreover, suitably developed cams can be employed to produce the desired sequentially occurring phases of operation for each of the conveyors and frameworks, one in timed relation to another. Likewise, without repetitively describing the required circuitry and pressure systems, the diagrammatic illustration of Fig. 38 is applicable in equal manner for control of the conveyors G and J and the interposed framework H as well as for the conveyors C and F and the related framework E.

Essentially, the apparatus in its entirety will now be understood to operate first along one side and then along the other to rapidly and completely remove undesired material from the edges of a bent laminated safety glass sheet in a highly efficient manner as the same is carried forwardly along a conveyor line. Also that each of the involved conveyors and/or frameworks can be caused to swing or rock in any desired timed relation according to the bent curvature of the article to be processed therethrough.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

I claim:

1. An apparatus for treating the edges of a bent laminated glass sheet, comprising, in combination, conveyor means for moving the bent sheet along a path disposed substantially transversely to an axis of curvature thereof, a pair of axially parallel traction rolls disposed transversely of said path and between which said sheet is passed, brushing means engageable with one edge of the sheet as it moves along said path, means positioned to engage the opposite edge of said sheet to maintain the first edge in contact with said brushing means, means mounting said rolls and said brushing means for swinging movement as a unit about a substantially horizontal axis, and means for swinging said rolls and brushing means about said axis from one side to the other of a vertical plane to dispose the same in position to receive the leading curved end of the bent sheet and to subsequently discharge said sheet from therebetween.

2. An apparatus of the character defined in claim 1, including means located between said conveyor means and said traction rolls and engageable by said sheet for guiding the leading curved end thereof into the pass between said traction rolls.

3. An apparatus of the character defined in claim 1, in which means is provided for producing a progressively variable rate of swinging motion of the traction rolls and the brushing means according to the curvature of the glass sheet.

4. An apparatus of the character defined in claim 3, in which said means for producing the progressively variable rate of swinging motion of the rolls and brushing means includes a rotatable cam.

5. An apparatus of the character defined in claim 4, which includes means to rotate said cam when the glass sheet is passed between the pair of rolls, and means operatively connecting the swinging means for the pair of rolls and the brushing means with the rotatable cam.

6. An apparatus of the character defined in claim 1, in which means is provided for mounting said brushing means for rotation about an axis substantially perpendicular to the axes of the said rolls.

7. An apparatus of the character defined in claim 6, in which means is provided for oscillating said brushing means in substantially the plane of its perpendicularly disposed axis to move said brushing means transversely of and in engagement with the edge of the sheet to be treated.

8. An apparatus of the character defined in claim 7, including fluid means for maintaining said brushing means in engagement with an adjacent edge of the glass sheet, and means controlling said fluid means to allow for movement of said brushing means transversely of the sheet to compensate for the curvature of the edge of said sheet.

9. An apparatus of the character defined in claim 1, in which the means engaging one edge of the glass sheet engages the edge thereof in continuous rolling contact, while the opposite edge of the sheet is treated by said brushing means.

10. An apparatus of the character defined in claim 9, in which said pair of traction rolls are interposed between said edge engaging means, said edge engaging means including a pair of vertically disposed rolls equally spaced from said supporting rolls to balance the thrust of engagement of said brushing means against the opposite edge of the glass sheet moving between said traction rolls.

11. An apparatus of the character defined in claim 10, in which each edge engaging roll is resiliently mounted for movement to follow the edge of the curved glass sheet.

12. An apparatus for treating the edges of a bent laminated glass sheet, conveyor means moving the bent glass sheet along a predetermined path disposed substantially transversely to the axis of curvature thereof, a frame arranged transversely of said path for swinging movement about a horizontal axis disposed in parallel to the axis of curvature of said bent sheet, a pair of axially parallel traction rolls carried by the frame and between which said sheet is passed, means for driving at least one of said support rolls, means for swinging said frame about said axis from one side to the other of a vertical plane to dispose the rolls in position to receive the leading curved end of the bent sheet and to subsequently discharge the said sheet from therebetween operatively driven brushing means, a carriage reciprocally mounted on the frame and supporting the brushing means thereon, means urging the carriage toward the traction rolls to locate the said brushing means in the path of the moving glass sheet to engage one edge thereo, and means engaging the opposite edge of the sheet to maintain the said sheet in the predetermined path of movement.

13. An apparatus for treating the edges of a bent laminated glass sheet, conveyor means moving the bent glass sheet along a predetermined path disposed substantially transversely to the axis of curvature thereof, a frame arranged transversely of said path for swinging movement about a horizontal axis disposed in parallel to the said axis of curvature of the sheet, a pair of traction rolls carried by the frame and between which said sheet is passed, means for driving one of said rolls to move the sheet therebetween, means for swing the frame about said horizontal axis in timed relation to the movement of the sheet to dispose the traction rolls in position to receive the leading curved end of the bent sheet and to subsequently discharge the said sheet from therebetween, operatively driven brushing means disposed in the path of sheet movement and rotatable about an axis substantially perpendicular to the axis of curvature of said sheet, a carriage mounted on the frame, a holder for said brushing means pivotally mounted on said carriage, fluid means for moving the carriage toward and away from said traction rolls, oscillatory means connected to the holder for swinging said brushing means in a plane parallel to the perpendicular axis thereof, and means controlling said fluid means to maintain the brushing means in engagement with the edge of the glass sheet to be treated.

14. An apparatus of the character defined in claim 13, in which means is provided to guide the glass sheet between said traction rolls and to maintain the opposite edge of the sheet against said brushing means.

15. An apparatus of the character defined in claim 13, in which means is provided between said conveyor means and said frame and engageable with said sheet for guiding the curved leading edge thereof along a plane tangentially common to the axes of the traction rolls.

16. An apparatus of the character defined in claim 13, in which the oscillatory means includes a motor carried by said carriage, a crank rotated thereby, and a link connecting said crank and said holder.

References Cited in the file of this patent

UNITED STATES PATENTS

| | | |
|---|---|---|
| 1,328,242 | Farley | Jan. 13, 1920 |
| 1,540,110 | Dittmar | June 2, 1925 |
| 1,829,647 | Hackett | Oct. 27, 1931 |
| 1,850,465 | Kranich | Mar. 22, 1932 |
| 1,961,487 | Hamann | June 5, 1934 |
| 2,252,787 | Sarver | Aug. 19, 1941 |
| 2,724,486 | Hatch et al. | Nov. 22, 1955 |
| 2,729,581 | Pascoe et al. | Jan. 3, 1956 |
| 2,831,791 | Downes et al. | Apr. 22, 1958 |

FOREIGN PATENTS

| | | |
|---|---|---|
| 1,120,145 | France | Apr. 16, 1956 |

UNITED STATES PATENT OFFICE

CERTIFICATE OF CORRECTION

Patent No. 2,926,371 March 1, 1960

Rollin L. Swindler

It is hereby certified that error appears in the printed specification of the above numbered patent requiring correction and that the said Letters Patent should read as corrected below.

Column 4, line 57, for "broke" read -- broken --; column 5, line 67, for "hte" read -- the --; column 14, line 20, for "rearwarly" read -- rearwardly --; line 38, for "palte" read -- plate --; line 71, for "occassioned" read -- occasioned --; column 15, line 26, for "The" read -- These --; column 18, line 16, for "orignal" read -- original --; column 19, lines 30 and 31, for "under-sired" read -- undesired --; column 21, line 19, for "thereo" read -- thereof --; line 31, for "swing" read -- swinging --.

Signed and sealed this 16th day of August 1960.

(SEAL)
Attest:

KARL H. AXLINE
Attesting Officer

ROBERT C. WATSON
Commissioner of Patents